United States Patent
Park et al.

(10) Patent No.: US 10,579,206 B2
(45) Date of Patent: Mar. 3, 2020

(54) DISPLAY APPARATUS AND METHOD FOR CONTROLLING THE DISPLAY APPARATUS

(71) Applicant: SAMSUNG ELECTRONICS CO., LTD., Suwon-si (KR)

(72) Inventors: Jee-hoon Park, Seoul (KR); Woong-Ki Lee, Yongin-si (KR); Jun-yong Park, Suwon-si (KR); Hyun-yong Choi, Suwon-si (KR); You-na Choo, Seongnam-si (KR); Soo-hyun Whang, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/798,623

(22) Filed: Oct. 31, 2017

(65) Prior Publication Data
US 2018/0164981 A1   Jun. 14, 2018

(30) Foreign Application Priority Data

Dec. 14, 2016   (KR) .................... 10-2016-0170607
Dec. 27, 2016   (KR) .................... 10-2016-0180307

(51) Int. Cl.
*G06F 3/00*    (2006.01)
*G06F 3/0481*  (2013.01)
(Continued)

(52) U.S. Cl.
CPC ........ *G06F 3/04812* (2013.01); *G06F 3/0482* (2013.01); *G06F 3/04842* (2013.01);
(Continued)

(58) Field of Classification Search
CPC ............... G06F 3/0488; G06F 3/04815; G06F 3/04842; G06F 3/04812; G06F 3/04845;
(Continued)

(56) References Cited

U.S. PATENT DOCUMENTS 5,870,097 A  *  2/1999  Snyder ............... G06T 11/001
                                                   345/422
6,411,326 B1 *  6/2002  Tabata ............... G02B 27/017
                                                    348/47
(Continued)

FOREIGN PATENT DOCUMENTS

JP      2000-276613 A    10/2000
JP         3802653 B2     7/2006
(Continued)

OTHER PUBLICATIONS

Written Opinion (PCT/ISA/237) issued by the International Searching Authority in corresponding International Application No. PCT/KR2017/011736, dated Feb. 2, 2018.
(Continued)

*Primary Examiner* — Laurie A Ries
(74) *Attorney, Agent, or Firm* — Sughrue Mion, PLLC

(57) ABSTRACT

A display apparatus, including a display configured to display an image, at least one sensor configured to generate sensing data relating to a position of a user with respect to the display apparatus, a memory configured to store background image data relating to a background image of a background area behind the display, and a processor configured to generate a content screen based on the background image data and the sensing data and control the display to display generated content screen, wherein the content screen includes at least one graphic object disposed on the background image, and wherein at least one from among the background image and the at least one graphic object are changed in response to a change of the sensing data.

12 Claims, 35 Drawing Sheets

(51) Int. Cl.
| | |
|---|---|
| *G06F 3/0484* | (2013.01) |
| *G06F 3/0482* | (2013.01) |
| *G06T 11/60* | (2006.01) |
| *H04N 21/431* | (2011.01) |
| *H04N 21/4223* | (2011.01) |
| *H04N 21/442* | (2011.01) |
| *H04N 5/57* | (2006.01) |
| *G06F 3/14* | (2006.01) |
| *H04N 5/232* | (2006.01) |
| *H04N 5/445* | (2011.01) |
| *H04N 9/64* | (2006.01) |

(52) U.S. Cl.
CPC ............ *G06F 3/04845* (2013.01); *G06F 3/14* (2013.01); *G06T 11/60* (2013.01); *H04N 5/57* (2013.01); *H04N 21/4223* (2013.01); *H04N 21/431* (2013.01); *H04N 21/44218* (2013.01); *G09G 2320/0626* (2013.01); *G09G 2320/0666* (2013.01); *G09G 2330/022* (2013.01); *G09G 2340/0464* (2013.01); *G09G 2340/14* (2013.01); *G09G 2360/144* (2013.01); *G09G 2360/145* (2013.01); *H04N 5/23238* (2013.01); *H04N 5/445* (2013.01); *H04N 9/64* (2013.01)

(58) Field of Classification Search
CPC .............. G06F 3/14; G09G 2340/0464; H04N 21/44218
See application file for complete search history.

(56) References Cited

U.S. PATENT DOCUMENTS

| | | | | |
|---|---|---|---|---|
| 6,731,309 | B1* | 5/2004 | Unbedacht | G06F 17/212 |
| 8,026,929 | B2* | 9/2011 | Naimark | G06T 15/205 |
| | | | | 345/588 |
| 8,185,219 | B2* | 5/2012 | Gilbert | G06F 9/4488 |
| | | | | 700/83 |
| 8,593,510 | B2* | 11/2013 | Yoo | G06F 3/017 |
| | | | | 348/51 |
| 9,094,576 | B1* | 7/2015 | Karakotsios | H04N 7/157 |
| 9,118,894 | B2* | 8/2015 | Shinohara | H04N 13/279 |
| 9,581,962 | B1* | 2/2017 | Duffy | G03H 1/0005 |
| 9,699,405 | B2* | 7/2017 | Wan | H04N 7/144 |
| 9,894,262 | B2* | 2/2018 | Kawana | H04N 5/23216 |
| 10,062,133 | B1* | 8/2018 | Mishra | G06F 3/14 |
| 2004/0051813 | A1* | 3/2004 | Marmaropoulos | G09G 5/00 |
| | | | | 348/553 |
| 2006/0031682 | A1* | 2/2006 | Sakai | H04M 3/436 |
| | | | | 713/182 |
| 2007/0143789 | A1* | 6/2007 | Shiomi | G06F 3/14 |
| | | | | 725/38 |
| 2008/0122737 | A1 | 5/2008 | Lea et al. | |
| 2008/0291123 | A1* | 11/2008 | Kondo | A47B 81/06 |
| | | | | 345/55 |
| 2009/0051699 | A1* | 2/2009 | Posa | H04N 13/373 |
| | | | | 345/619 |
| 2011/0115880 | A1* | 5/2011 | Yoo | H04N 13/156 |
| | | | | 348/42 |
| 2011/0193860 | A1* | 8/2011 | Lee | H04N 13/261 |
| | | | | 345/419 |
| 2012/0013646 | A1* | 1/2012 | Ichioka | G09G 5/00 |
| | | | | 345/690 |
| 2013/0088420 | A1* | 4/2013 | Kang | G06F 3/013 |
| | | | | 345/156 |
| 2013/0178257 | A1* | 7/2013 | Langseth | G06T 17/05 |
| | | | | 463/4 |
| 2013/0207948 | A1* | 8/2013 | Na | G09G 3/003 |
| | | | | 345/207 |
| 2014/0063052 | A1* | 3/2014 | Choi | G09G 5/377 |
| | | | | 345/629 |
| 2014/0132726 | A1* | 5/2014 | Jung | H04N 5/44582 |
| | | | | 348/46 |
| 2014/0143687 | A1* | 5/2014 | Tan | G06F 3/1462 |
| | | | | 715/757 |
| 2015/0009391 | A1* | 1/2015 | Kim | H04N 5/23216 |
| | | | | 348/333.05 |
| 2015/0121232 | A1* | 4/2015 | Edwardson | G09B 5/02 |
| | | | | 715/732 |
| 2015/0154944 | A1* | 6/2015 | Honjo | G09G 5/00 |
| | | | | 345/667 |
| 2015/0254881 | A1* | 9/2015 | Duan | G06T 19/006 |
| | | | | 345/660 |
| 2015/0339023 | A1 | 11/2015 | Park et al. | |
| 2016/0148554 | A1* | 5/2016 | Lim | G09G 3/20 |
| | | | | 345/694 |
| 2016/0217592 | A1* | 7/2016 | Croxford | G06T 11/00 |
| 2016/0234483 | A1* | 8/2016 | Hirai | H04N 13/302 |
| 2016/0341959 | A1* | 11/2016 | Gibbs | G06K 9/00671 |
| 2016/0344947 | A1* | 11/2016 | Wathington | H04N 5/2621 |
| 2017/0076461 | A1* | 3/2017 | Zhou | G06T 7/136 |
| 2017/0132694 | A1* | 5/2017 | Damy | G06Q 30/0643 |
| 2017/0269677 | A1* | 9/2017 | Arriaga Fuentes | G06F 1/3212 |
| 2018/0018938 | A1 | 1/2018 | Lee et al. | |
| 2018/0158385 | A1* | 6/2018 | Reichow | G09G 3/003 |

FOREIGN PATENT DOCUMENTS

| | | |
|---|---|---|
| JP | 2006-333301 A | 12/2006 |
| JP | 2011-70495 A | 4/2011 |
| JP | 2011-164184 A | 8/2011 |
| JP | 4904692 B2 | 3/2013 |
| JP | 2016-116162 A | 6/2016 |
| KR | 10-0462017 B1 | 6/2005 |
| KR | 10-2015-0020920 A | 2/2015 |
| KR | 10-2016-0061794 A | 6/2016 |
| KR | 10-1631451 B1 | 6/2016 |
| KR | 1020180009153 A | 1/2018 |

OTHER PUBLICATIONS

International Search Report (PCT/ISA/210) issued by the International Searching Authority in corresponding International Application No. PCT/KR2017/011736, dated Feb. 2, 2018.
Communication dated Jun. 3, 2019, issued by the European Patent Office in counterpart European Application No. 17881886.0.

* cited by examiner

910

910

DISPLAY APPARATUS AND METHOD FOR CONTROLLING THE DISPLAY APPARATUS

CROSS-REFERENCE TO RELATED APPLICATION

This application is based on and claims priority from Korean Patent Application No. 10-2016-0170607 filed in the Korean Intellectual Property Office on Dec. 14, 2016, and Korean Patent Application No. 10-2016-0180307, filed in the Korean Intellectual Property Office on Dec. 27, 2016, the disclosures of which are incorporated herein by reference in their entirety.

BACKGROUND

1. Field

Apparatuses and methods consistent with example embodiments relate to a display apparatus and a method for controlling the display apparatus, and more particularly, to a display apparatus that includes a background image corresponding to background area behind the display apparatus, and is capable of displaying a content screen that is changed according to a user position, and a method for controlling the same.

2. Description of Related Art

Various user experiences by using a display apparatus have been developed. For example, by acquiring and displaying a background image of the background behind a display apparatus, a user can be provided with a visual effect such that the display appears as a transparent window.

However, even if the display provides a content screen including the background image, if the same content screen is provided irrespective of the user's location, there may arise a problem that the visual effect in which the display appears as a transparent window according to the user's position may be deteriorated.

SUMMARY

One or more example embodiments provide a display apparatus capable of adaptively processing a content screen that includes a background image displayed in a display apparatus and providing it, and a method for controlling the display apparatus.

Another aspect of the present disclosure provides a display apparatus capable of improving a three-dimensional effect by improving a different view angle to a background image and a main image.

According to an aspect of an exemplary embodiment, a display apparatus includes a display configured to display an image, at least one sensor configured to generate sensing data relating to a position of a user with respect to the display apparatus, a memory configured to store background image data relating to a background image of a background area behind the display, and a processor configured to generate a content screen based on the background image data and the sensing data and control the display to display generated content screen, wherein the content screen includes at least one graphic object disposed on the background image, and wherein at least one from among the background image and the at least one graphic object are changed in response to a change of the sensing data.

The processor may be further configured to, in response to a user movement o determined based on the sensing data, change at least one from among a position, a color, and a size of the at least one graphic object based on the user movement.

The processor may be further configured to, in response to a user movement determined based on the sensing data, change at least a part of the at least one graphic object based on the user movement.

The processor may be further configured to, in response to a determination based on the sensing data that the user is positioned within a predetermined distance from the display apparatus control the display to remove at least a part of the at least one graphic object.

The processor may be further configured to, in response to receiving a user input while the at least one graphic object is displayed, control the display to rotate the at least one graphic object based on the user input.

The processor may be further configured to control the display to change a brightness of the content screen in response to a user movement determined based on the sensing data.

The content screen further includes a shadow of the at least one graphic object, and the processor may be further configured to control the display to change the shadow in response to a change of the at least one graphic object.

The apparatus may further include at least one camera configured to acquire an image having an angle of view of 360 degrees with reference to the display apparatus, wherein the background image data is acquired by using a camera from among the at least one camera to photograph the background area behind the display apparatus.

The at least one sensor may be further configured to include at least one camera having an angle of view of at least 180 degrees with reference to the display apparatus, and the at least one camera may be further configured to acquire the sensing data.

The processor may be further configured to deactivate the display in response to determining that the user is not present in a peripheral area of the display apparatus based on the sensing data.

According to another aspect of an exemplary embodiment, a display apparatus includes a display configured to display an image, an image processor configured to perform first view angle improvement processing on an object image to provide a processed object image, to perform second view angle processing on a main image to provide a processed main image, and to combine the processed object image and the processed main image to provide a combined image, and a processor configured to control the display to display the combined image.

The image processor may be further configured to combine the processed object image with the main image.

The image processor may be further configured to generate the combined image by generating a first layer corresponding to the object image, generating a second layer corresponding to the main image, performing the first view angle improvement processing on the first layer to provide a processed first layer, and mixing the processed first layer with the second layer.

The main image may include a background image that corresponding to a background area behind the display apparatus, and the object image may include an image that represents at least one from among an analog clock, a digital clock, a photo image, and a picture.

The main image may include a video image that corresponds to a content provided by an external source, and the object image may include an on screen display (OSD) for controlling the display apparatus.

The first view angle improvement processing may relate to a second lookup table having a gamma value different from a reference gamma value, and determining luminance values of each of a plurality of pixels.

The second look up table may include a higher gamma value than the reference gamma value in a low gradation section, or include a lower gamma value than the reference gamma value in a high gradation section.

The processor may be further configured to determine the luminance values using the second lookup table with respect to pixels on which the object image is to be displayed, and using a first lookup table having a reference gamma value with respect to pixels on which the main image is to be displayed.

The apparatus may further include a sensor configured to identify a position of a user, and the processor may be further configured to determine whether to perform the first view angle improvement processing and the second view angle processing based on the identified position of the user.

According to another aspect of an exemplary embodiment, a method for controlling a display apparatus that includes a display includes storing background image data relating to a background image of a background area behind the display, acquiring, from at least one sensor, sensing data relating to a position of a user with respect to the display apparatus, generating a content screen based on the background image data and the sensing data, and displaying the generated content screen, wherein the content screen includes at least one graphic object disposed on the background image, and wherein at least one from among the background image and the at least one graphic object are changed in response to a change of the sensing data.

According to another aspect of an exemplary embodiment, a method for controlling a display apparatus includes capturing a background image of a background area behind the display apparatus, sensing a user position of a user with respect to the display apparatus, displaying a content screen including at least one graphic object disposed on the background image, and in response to a change of the user position, changing an appearance of the background image or changing a position of the at least one graphic object with respect to the background image.

BRIEF DESCRIPTION OF THE DRAWINGS

The above or other aspects will become more apparent by reference to example embodiments which are illustrated in the appended drawings. Understanding that these drawings depict only example embodiments and are not therefore to be considered to be limiting of the scope of the disclosure, the principles herein are described and explained with additional specificity and detail via the use of the accompanying drawings, in which.

DETAILED DESCRIPTION

Figure 1:
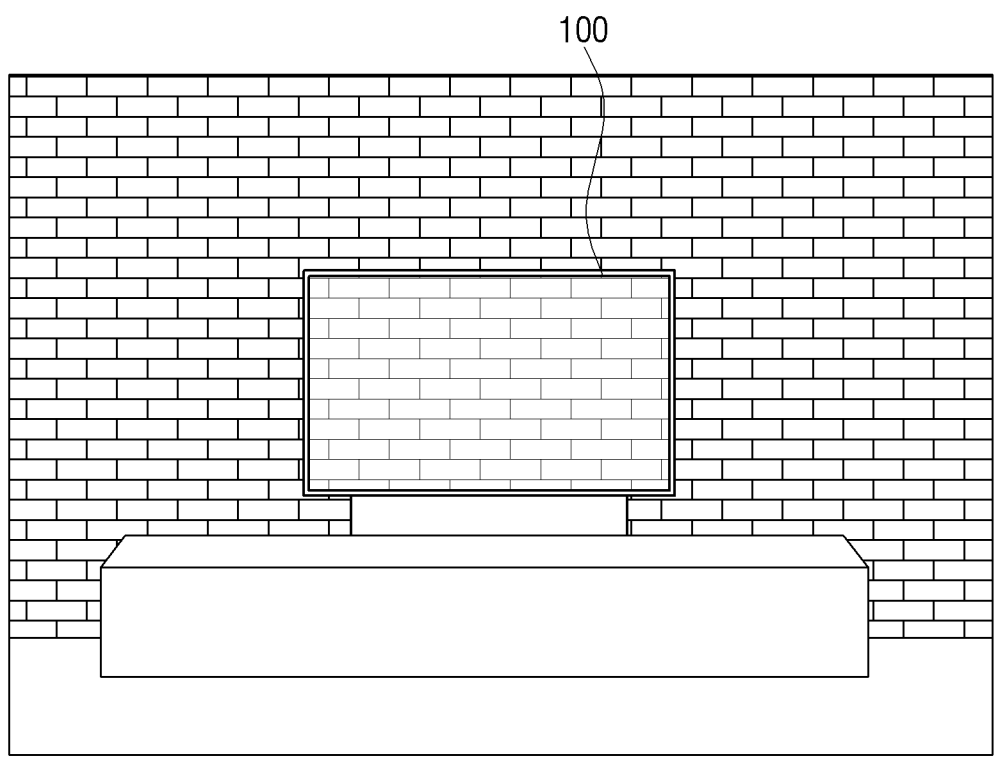
FIG. 1 is a diagram illustrating an example embodiment to provide an image effect in which a display appears as a transparent window, according to an example embodiment.

Exemplary embodiments may have a variety of modifications and several embodiments. Accordingly, specific exemplary embodiments will be illustrated in the drawings and described in detail in the detailed description. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

In the present disclosure, relational terms such as first and second, and the like, may be used to distinguish one entity from another entity, without necessarily implying any actual relationship or order between such entities.

The terms used herein are solely intended to explain specific example embodiments, and not to limit the scope of the present disclosure. It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In an example embodiment, 'a module' or 'a unit' performs at least one function or operation, and may be hardware, such as a processor or integrated circuit, software that is executed by a processor, or a combination thereof. In addition, a plurality of 'modules' or a plurality of 'units' may be integrated into at least one module and may be at least one processor except for 'modules' or 'units' that should be realized in a specific hardware.

Below, example embodiments will be described in detail with reference to the attached drawings.

The display apparatus 100 according to an example embodiment provides two operation modes. First, a first operation mode, for example, normal mode, is a mode for displaying a normal image. Specifically, the first operation mode is a mode for displaying a pre-stored content or broadcast received from an external source by using an entire screen of the display apparatus.

In addition, a second operation mode is a mode for displaying, by a display apparatus, a content screen that includes a background image corresponding to background area behind the display apparatus to provide a visual effect in which the display apparatus appears as a glass window. In this regard, the content screen may include a background image on the rear surface at which the display apparatus 100 is positioned, and may include at least one object or a shadow of the at least one object.

When a content is displayed in the second operation mode, the display apparatus 100 may display a background area behind the display apparatus 100 as a background image, and thereby the user may feel that the display apparatus 100 has become a transparent glass window.

In the second operation mode, the display may display not only a background image but also a particular graphic object together with the background image. In this regard, the particular graphic object may be a clock object, but various graphic objects that may be attached to a normal wall, for example, picture, photo, fishbowl, memo, and the like, may be displayed as well.

When the display apparatus 100 is operated in the second operation mode, that is, when a content screen that includes a background image is displayed, it is difficult for the user to perceive the difference between the display apparatus 100 and the actual background area when a difference in brightness, etc., between the actual background area and a background image displayed on the display apparatus 100 is small.

Accordingly, the content screen including the background image displayed on the display apparatus 100 also may be adaptively changed in accordance with the change in the surrounding environment of the display apparatus 100.

Accordingly, the display apparatus 100 according to an example embodiment detects a peripheral lighting environment, and processes a content screen displayed on the display apparatus 100 according to the detected peripheral lighting environment and displays it.

The display apparatus 100 according to an example embodiment detects a user position, and processes a content screen displayed on the display apparatus 100 according to the detected user position and displays it. That is, when a user moves, the display apparatus 100 may adaptively process a content screen according to the detected user information.

In addition, when the display apparatus 100 displays a background image together with an object, the display apparatus 100 may provide a three-dimensional effect so that the displayed object and background image have a different depth perception.

In related art, in order to provide a three-dimensional effect, contrast ratio and color are set differently for each area, or a 3D function is used. However, when varying contrast ratio and color, the improvement in 3D effect is not significant, and the 3D function has a disadvantage that the user needs to wear a special film or glasses.

Accordingly, in the present example embodiment, a processing method is used so that a three-dimensional effect can be perceived by a user in accordance with a viewing direction by using a view angle improvement method. Specifically, the display apparatus 100 may perform a view angle improving process on the object without performing a separate view angle improving process on the background image so that the stereoscopic effect of the object can be emphasized according to the viewing direction.

In particular, in the display apparatus 100 according to an example embodiment, a viewing angle with respect to the displayed object is improved, whereas a viewing angle with respect to the background image disposed behind the object is not improved, and thereby a three-dimensional effect between the object and the background image can be further emphasized according to a viewing direction. For example, when a user views an image at a fixed position without moving, the display apparatus 100 may perform different view angle processing on the background image and the object and provide a stereoscopic image. This will be described in further detail below with reference to FIGS. 17 to 25.

In the above example a viewing angle improvement is not performed on the background image. However, in the case where a method in which view angle improvement consisting of multiple steps is used, it is possible to process the object using a method involving much view angle improvement, and it is also possible to process the background image in a method that involves, for example, less view angle improvement.

Example embodiments relating to the above-mentioned operations will be described in detail using specific configurations of the display apparatus 100.

Figure 2:
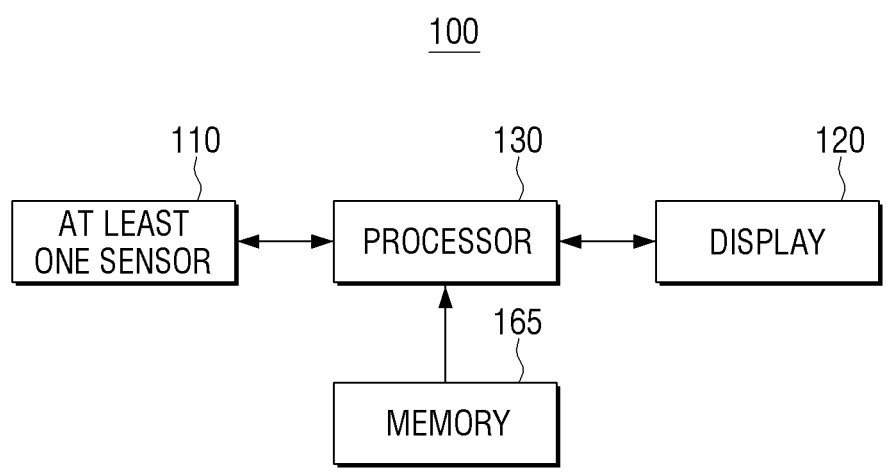
FIG. 2 is a block diagram illustrating the structure and operation of a display apparatus, according to an example embodiment.

FIG. 2 is a block diagram illustrating a configuration of the display apparatus 100 according to an example embodiment. As illustrated in FIG. 2, the display apparatus 100 includes at least one sensor 110, a display 120, a memory 165, and a processor 130.

At least one sensor 110 generates sensing data with respect to a user position peripheral to the display apparatus. In this regard, the at least one sensor 110 may include at least one camera for acquiring an image, for example an image having an image angle of 180 degrees or more with respect to the display apparatus 100. However, this is only an example, and another sensor capable of detecting a user position may be included in the technical concept of the present disclosure.

The display 120 displays image data. In particular, while the display apparatus 100 is operated in a first operation mode, the display 120 may display image content acquired from an external source, for example, broadcasting station, server, DVD, and the like. In addition, while the display apparatus 100 is operated in a second operation mode, the display 120 may display a content screen that includes a pre-stored background image. In this regard, the content screen may include at least one graphic object on the background image. In addition, the content screen may also include a shadow of the at least graphic object.

The memory 165 may store a program and data for controlling the display apparatus 100. In particular, the memory 165 may store data relating to a background image corresponding to a background area behind the display apparatus 100. In this regard, the data on the background image may be acquired from an external device, for example, a smartphone and the like, but this is only an example. The data may be acquired from at least one camera that is connected with the display apparatus and acquires an image having an angle of view of 360 degrees with respect to the display apparatus 100.

The processor 130 controls overall operations of the display apparatus 100. In particular, the processor 130 may generate a content screen based on data with respect to a background image stored in the memory 165 and sensing data acquired by at least one sensor 110, and control the display 120 to display the generated content screen. In this regard, the content screen may include at least one graphic object on the background image. In this regard, the background image and the at least one graphic object may be changed in response to a change in sensing data according to a user position.

When it is determined through the sensing data that a user has moved, the processor 130 may change at least one of a position, color and size of the at least one graphic object and control the display 120 to display the content screen. For example, the processor 130 may move, change a color of, or change a size of the graphic object according to the movement of the user.

In addition, when it is determined through the sensing data that the user has moved, the processor 130 may change at least some of the at least one graphic object to a graphic object according to the movement of the user, and control the display 120 to display the content screen. Specifically, the processor 130 may change a first graphic object. for example, a clock object, from among the at least one graphic object to a second graphic object, for example, a calendar object, in accordance with the movement of the user.

In addition, when it is sensed through the sensing data that the user is positioned within a predetermined distance from the display apparatus 100, the processor 130 may control the display 120 to remove at least some of the at least one graphic object. That is, as the user gets closer to the display apparatus 100, the processor 130 may control the display 120 to remove at least some of the at least one graphic object.

In addition, while the at least one graphic object is displayed, when a user input is sensed, for example, user gesture and the like, the processor 30 may control the display 120 to rotate the at least one graphic object in accordance with the user input and display a content screen.

In addition, the processor 130 may control the display 120 to change a brightness of the background image according to the movement of the user determined by the sensing data and display the content screen. That is, the processor 130 may control the display 120 to adjust a brightness of the background image based on a direction of external light and a position of a user, and display a content screen.

In addition, the content screen may include a shadow of at least one graphic object. In this regard, the processor 130 may control the display 120 to change the shadow according to a change of at least one graphic object and display the content screen.

In addition, when it is determined through the sensing data that the user is not present in a peripheral area of the display apparatus, the processor 130 may turn off the display.

Figure 3:
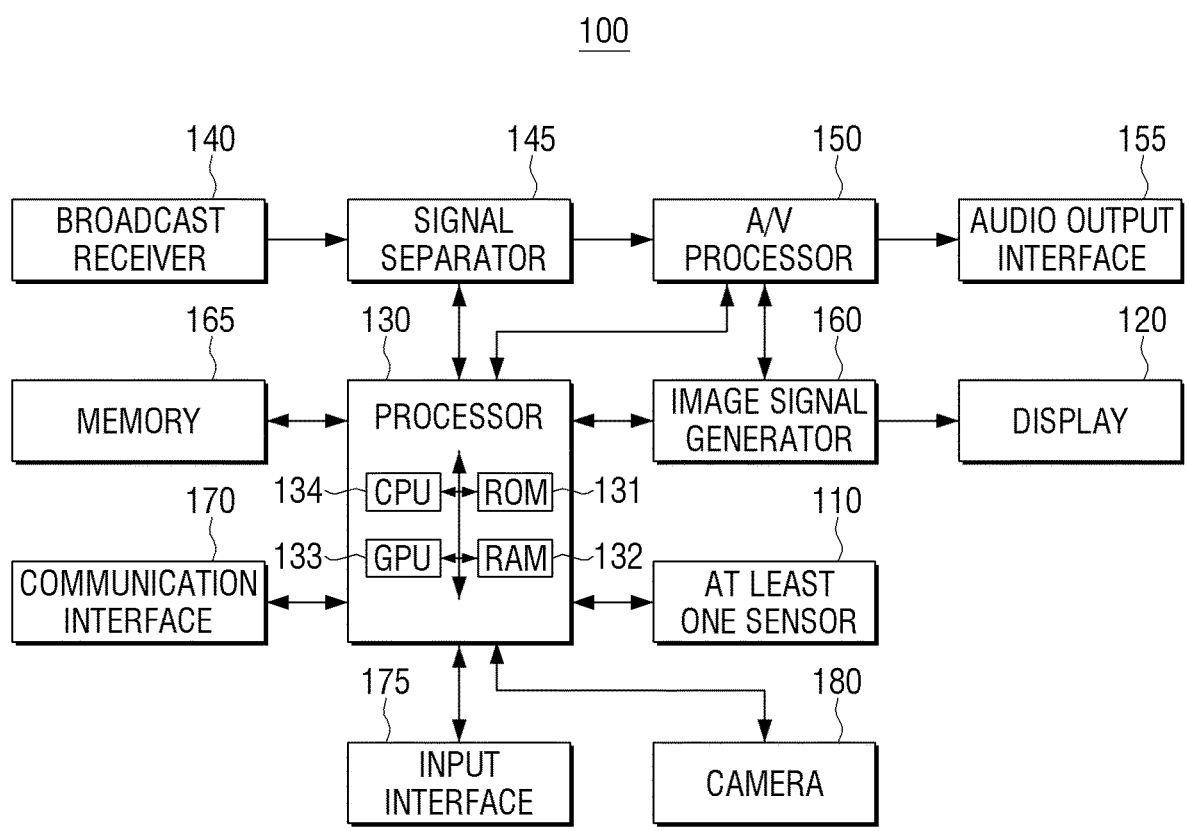
FIG. 3 is a block diagram illustrating a structure of a display apparatus, according to an example embodiment.

FIG. 3 is a block diagram illustrating a detailed structure of a display apparatus, according to an example embodiment. Referring to FIG. 3, the display apparatus 100 according to an example embodiment may include at least one sensor 110, a display 120, a processor 130, a broadcast receiver 140, a signal separator 145, an audio/video (A/V) processor 150, an audio output interface 155, an image signal generator 160, a memory 165, a communication interface 170, input interface 175, and a camera 180.

At least one sensor 110 generates sensing data with respect to a user position. In an example embodiment, at least one sensor 110 may include at least one camera that has an angle of view of at least 180 degrees to detect a user position. In another example embodiment, at least one sensor 110 may include various sensors, for example, a radio-frequency (RF) sensor, an infrared (IR) sensor, ultrasonic sensor, and the like, to detect a user position.

In addition, at least one sensor 110 may generate sensing data with respect to at least one from among a direction and brightness of an external light projected from an external light source disposed outside the display 120 to the display 120. In this regard, at least one sensor 110 may include a plurality of sensors that are disposed at positions that are spaced apart from each other on the display apparatus 100. At least one sensor 110 may include, for example, as two sensors, or may include four or more sensors. In addition, the sensor may be a luminance sensor for detecting luminance, and may be a color sensor capable of detecting not only luminance but also color information and the like, a camera for photographing an image, and the like. The sensors mentioned above may be embedded in an external frame of the display apparatus 120 so that they are not affected by the influence of light emitted from the display 120. When at least one sensor 110 includes two sensors, the two sensors may include one luminance sensor and one color sensor, or may include two luminance sensors, or two color sensors.

The display 120 displays an image. The display 120 may be implemented as various types of displays, such as a Liquid Crystal Display (LCD), a Plasma Display Panel (PDP), and the like. The display 120 may include a driving circuit, a backlight unit, and the like which may be implemented in forms such as an a-si TFT, a low temperature poly silicon (LTPS) TFT, an organic TFT (OTFT), and the like. The display 120 may be a touch screen including a touch sensor.

The display 120 includes a backlight. In this regard, the backlight is a point light source that includes a plurality of light sources, and supports local dimming.

In this case, the light source included in the backlight may be configured with a cold cathode fluorescent lamp (CCFL) or a light emitting diode (LED). In exemplary embodiments illustrated and described below, the backlight is configured with an LED and an LED driving circuit. However, at the time of implementation, the backlight may be a feature other than the LED. A plurality of light sources included in such a backlight may be disposed in various forms, and a variety of local dimming techniques may be applied. For example, the backlight may be a direct type backlight in which a plurality of lights are disposed in a matrix form and uniformly arranged on the entire LED screen. In this regard, the backlight may be operated with full-array local dimming or direct local dimming. The full-array local dimming may be a dimming method which adjusts the brightness of each light source as a whole, evenly spreading the entire light source behind the LCD screen. In addition, the direct local dimming may be similar to the full-array local dimming method, but may adjusts the brightness of each light source with a fewer number of light sources.

In addition, the backlight may be a direct type backlight which disposes a plurality of light sources in the entire area or an edge type backlight in which a plurality of light sources are disposed only on the edges of the LCD. In this regard, the backlight may be operated with edge-lit local dimming. In the edge-lit local dimming, a plurality of light sources are disposed on the edge of the panel, and can be disposed only on the left/right side, only on the upper/lower side, or on the left/right/upper/lower sides.

In particular, the display 120 may display a content screen that includes a background image. In this regard, the content screen may include an object layer that includes at least one graphic object, a shadow layer that includes a shadow of the at least one graphic object, and a background image layer that includes a background image.

In addition, the display 120 may be operated with a first frequency, for example, 120 Hz or 240 Hz, while being operated in the first operation mode, and may be operated with a second frequency, for example, 60 Hz, which is lower than the first frequency, while being operated in the second operation mode. In other words, the display 120 is operated with a low frequency while being operated in the second operation mode, thereby reducing power consumption.

The broadcast receiver 140 receives a broadcasting signal in a wired or wireless manner from a broadcasting station or a satellite and demodulates the received broadcasting signal. Specifically, the broadcast receiver 140 may receive a transmission stream via an antenna or a cable, demodulate it, and output a digital transmission stream signal.

The signal separator 145 divides a transmission stream signal provided from the broadcast receiver 140 into an image signal, an audio signal, and additional information signal. Further, the signal separator 145 transmits the image signal and the audio signal to the A/V processor 150.

The A/V processor 150 performs signal processing, such as video decoding, video scaling, and audio decoding, with respect to the video signal and the audio signal that are input from the broadcast receiver 140 or the memory 165. In addition, the A/V processor 150 outputs the image signal to the image signal provider 160 and outputs the audio signal to the audio output interface 155.

In the case of storing the received video and audio signals in the memory 165, the A/V processor 150 may compress the video and audio signals and store the compressed video and audio signals in the memory 165.

The audio output interface 155 converts the audio signal that is output from the A/V processor 150 into sound, and outputs the sound through a speaker or to an external device connected thereto through an external output terminal.

The image signal provider 160 may generate a graphical user interface (GUI) to provide the generated GUI to a user. Further, the image signal provider 160 may add the generated GUI to an image that is output from the A/V processor 150. In addition, the image signal provider 160 provides an image signal corresponding to an image to which a GUI is added to the display 120. The display 120 displays various information provided from the display apparatus 100 and an image transmitted from the image signal provider 160.

In addition, the image signal provider 160 may process a content screen generated by the processor 130, and may output it. Specifically, the image signal provider 160 may directly output a plurality of layers or synthesize or merge a plurality of layers, and provide it to the display 120.

The memory 165 may store various data and programs to drive the display apparatus 100. In addition, the memory 165 may receive and store image content, in which video and audio are compressed, from the A/V processor 150, and may output the stored image content to the A/V processor 150 under the control of the processor 130. The memory 165 may store data that relates to a background image.

The memory 165 may be implemented by a hard disk, a nonvolatile memory, or a volatile memory.

The input interface 175 may include a touch screen, touch pad, key button, keypad, and the like, to allow a user manipulation of the display apparatus 100. In the present example embodiment, an example in which a control command is received through the input interface 175 included in the display apparatus 100 is described, but the input interface 175 may receive a user manipulation from an external control device, for example a remote controller.

The communication interface 170 is configured to communicate with various kinds of external devices in various communication methods. The communication interface 170 may include a Wi-Fi chip 331 and a Bluetooth chip 332. The processor 130 may perform the communication with various external devices by using the communication interface 170. Specifically, the communication interface 170 may receive a control command from a control terminal device, for example, a smartphone and remote controller, capable of controlling the display apparatus 100.

The communication interface 170 may acquire weather information via communication with an external server.

In addition, according to example embodiments, the communication interface 170 may further include a USB port to which a USB connector is connected, various external input ports for connecting various external terminals such as a headset, mouse, and LAN, and a Digital Multimedia Broadcasting (DMB) chip that receives and processes a DMB signal.

The camera 180 may photograph an angle of view of at least 360 degrees, and may photograph a view from a rear side of the display apparatus 100, such as background area behind the display apparatus 100, to acquire data that relates to a background image. In this regard, the camera 180 may photograph a view from a rear side of the display apparatus 100 the display apparatus 100 once to acquire data that relates to a background image, but this is only an example. The camera may photograph a view from a rear side of the display apparatus 100, such as a background area behind the display apparatus 100, in real time to acquire data that relates to the background image. In this regard, the camera 180 may include a plurality of camera modules to acquire image data having an angle of view of at least 360 degrees based on the display apparatus 100.

The processor 130 controls overall operations of the display apparatus 100. Specifically, the processor 130 may control, in the first operation mode, the image signal provider 160 and the display 120 so that an image according to a control command received through the input interface 175 is displayed.

The processor 130 may include read-only memory (ROM) 131, random access memory (RAM) 132, a graphic processing unit (GPU) 133, a central processing unit (CPU) 134, and a bus. The ROM 131, the RAM 132, the GPU 133 and the CPU 134 may be connected with each other through the bus.

The CPU 134 may access the memory 165 and boot using the O/S stored in the memory 165. The CPU 134 may also perform various operations by using various types of programs, contents, data, and the like stored in the memory 165. Operations of the CPU 134 have been described above in connection with the processor 130 in FIG. 2, according to an example embodiment.

The ROM 131 may store a command set, and the like for system booting. If a turn-on command is input and the power is supplied, the CPU 134 copies the O/S stored in the memory 165 into the RAM 132 according to the command stored in the ROM 131, and boots the system by executing the O/S. When the booting is completed, the CPU 134 may copy the various programs stored in the memory 165 to the RAM 132, and perform various operations by implementing the programs copied to the RAM 132.

In detail, the GPU 133 may, when booting of the display apparatus 100 is completed, generate a screen that includes various objects such as an icon, an image, a text, and the like. Specifically, the GPU 133 may, when the display apparatus 100 is operated in the second operation mode, generate a content screen that includes a graphic object and a shadow of the graphic object on the background image.

The GPU 133 may be configured as a separate feature such as the image signal generator 160, and may be, for example, a System on Chip (SoC) that is combined with the CPU within the processor 130.

According to an example embodiment, processor 130 may, while being operated in the second operation mode, generate a content screen based on data that relates to a background image stored in the memory 165 and sensing data that is acquired by at least one sensor 110, and control the display 120 to display the content screen. In this regard, the content screen may include at least one graphic object on the background image. In this case, the background image and the at least one graphic object may be changed in response to a change of sensing data according to a user position.

Operations of the processor 130 are described in greater detail below with reference to the accompanying drawings.

In an example embodiment, the display apparatus 100 may receive data that relates to a background image from an external portable terminal, and store it in the memory 165. For example, the display apparatus 100 may receive, from the portable terminal, the acquired background image data using a guide member before the display apparatus 100 is installed.

A user may fix a guide member to a position, for example, a wall, for installing the display apparatus 100. Once the guide member is fixed, the portable terminal may acquire an image that includes the guide member positioned in an area at which the display apparatus 100 is to be installed by using a camera. In addition, the portable terminal may display the acquired image. In this case, the displayed image may include a plurality of indicators that guide positions of marks of a guide member to acquire an optimal background image. In addition, the portable terminal may, among the photographed images, analyze a background of an area, for example, wall area, at which the display apparatus 100 is positioned within a guide member, and acquire data that relates to a background image of a position at which the display apparatus 100 is installed. In this case, a background image may be an image of an area, for example, a wall, at which the display apparatus 100 is to be installed, and when a background image is displayed on the display apparatus 100, a user can be provided with a glass window effect through the display apparatus 100. Then, the portable terminal may transmit the data that relates to the background image to the display apparatus 100.

In another example embodiment, the processor 130 may acquire data that relates to a background image of an area to the rear of, or behind, the display apparatus 100 via a camera 180 having an angle of view of 360 degrees with reference to the display apparatus 100. In this case, the processor 130 may acquire the background image data of an area to the rear of the display apparatus 100 after the display apparatus 100 is installed.

For example, when the display apparatus 100 is installed in the middle of a street rather than near the wall, the processor 130 may acquire background image data in real time via the camera 180.

Figure 4A:
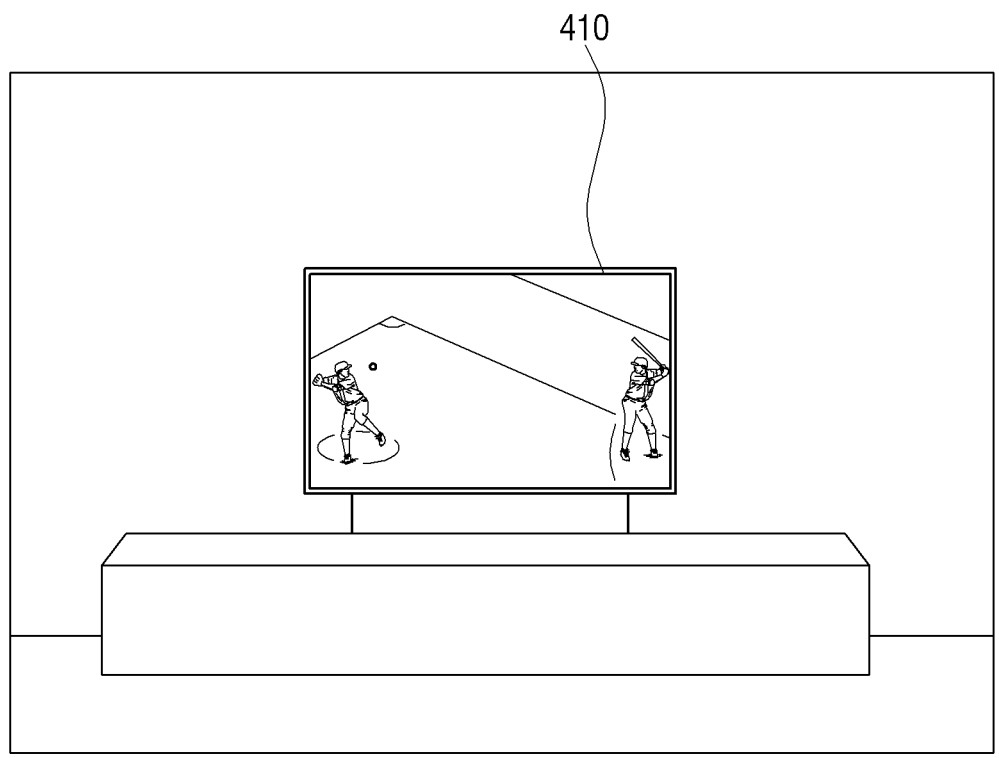
FIGS. 4A and 4B are diagrams illustrating a normal mode and a background mode of the display apparatus, according to an example embodiment.

In addition, while being operated in the first operation mode, or normal mode, the processor may control the display 120 to display an image content that is received from an external source or a pre-stored image content. For example, the processor 130 may control the display 120 to display a broadcast content 410 that is received via a tuner, as illustrated in FIG. 4A.

While the display apparatus 100 is operated in a normal mode, when a predetermined user command is detected, for example a command selecting a particular button on a remote controller, or a predetermined event is detected, for example an event in which the display apparatus 100 detects a user in a standby state when the display 120 is turned off, the processor 130 may switch an operation mode from the first operation mode to the second operation mode, or background mode.

Figure 4B:
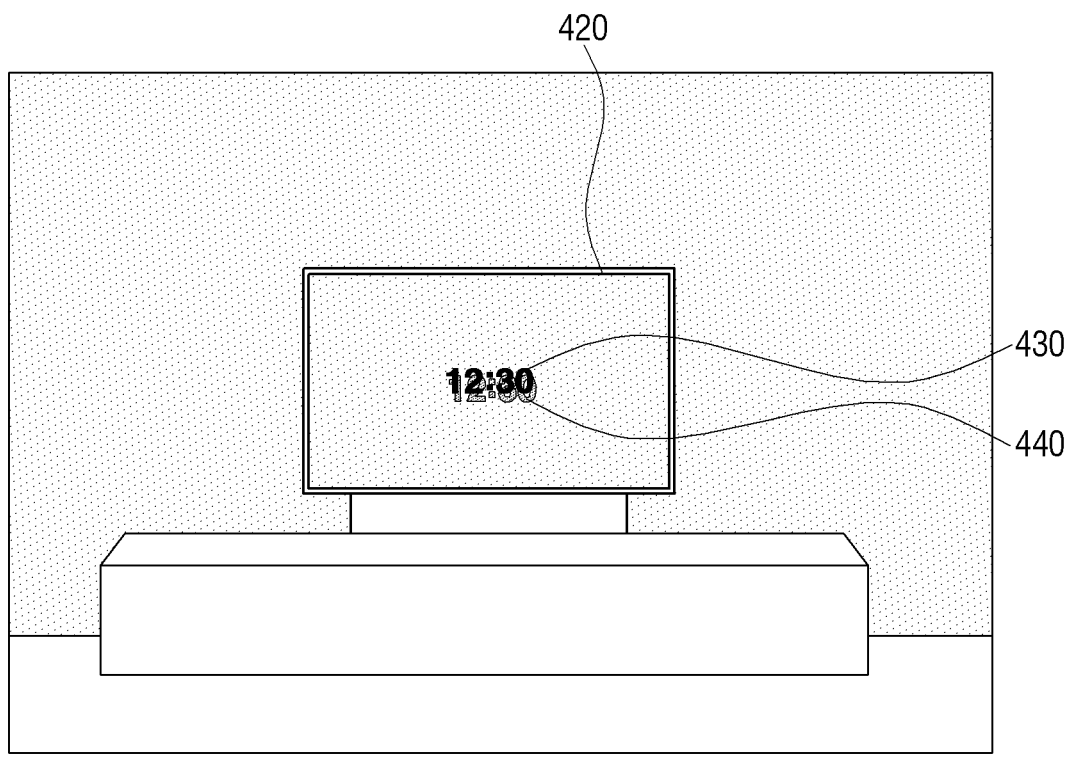

While the display apparatus 100 is operated in the second operation mode, the processor 130 may control the display 120 to display a content screen that includes a background image based on data that relates to a pre-stored background image and sensing data that is acquired through a luminance sensor. In this regard, the content screen may for example include a clock object 430 and a shadow 440 corresponding to the clock object 430 on the background image 420, as illustrated in FIG. 4B.

A position and appearance of the shadow 440 may be changed in response to a change of sensing data detected by the luminance sensor. Specifically, the position and appearance of the shadow 440 may be adjusted based on a direction and brightness of an external light.

Figure 5:
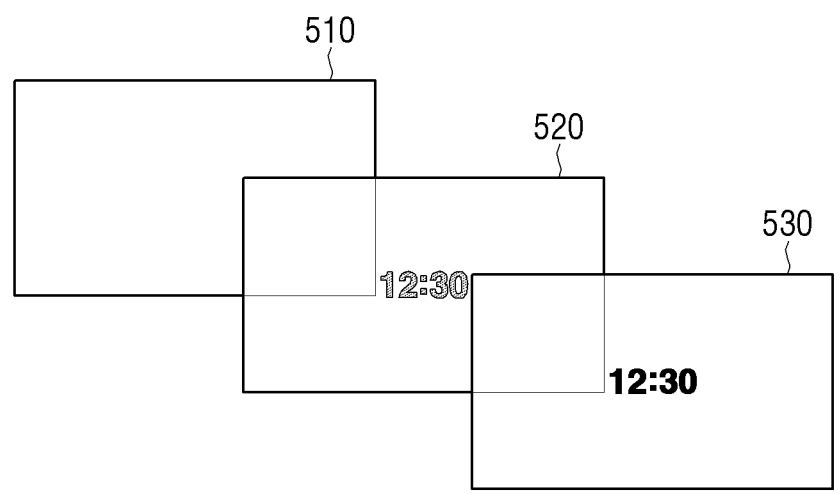
FIGS. 5, 6A through 6C, 7A through 7C, 8, 9A through 9C, 10A through 10C, 11A through 11B, 12, 13A through 13B, 14A through 14B, and 15A through 15B are diagrams illustrating a content screen which is adaptively changed according to external light or a user's position, according to various example embodiments.

For example, the processor 130 may generate a background image layer 510 that includes a background image 420 based on information that relates to the background image, as illustrated in FIG. 5. In addition, the processor 130 may generate an object layer 530 that includes the clock object 430, and may generate a shadow layer 520 that includes a shadow 440 of the clock object 430. Further, the processor 130 may control the display 120 to display the background image layer 510, the shadow layer 520 and the object layer 530 in the forward order as shown in FIG. 5.

FIG. 5 illustrates one object layer 530 and one shadow layer 520, but this is only an example. A plurality of object layers and a plurality of shadow layers may be generated as well. For example, the processor 130 may generate an object layer that includes a clock object and an object layer that includes a vine object, and may generate shadow layers that correspond to each of the objects. When a plurality of object layers are generated, the processor 130 may control the display 120 to arrange at the front, or on top of the other layers, an object layer that includes an object that is desired to be shown at the front, and display it accordingly. For example, when an object layer that includes a clock object and an object layer that includes a vine layer are generated, the processor 130 may control the display 120 to arrange the object layer that includes a clock object over, or in front of, the object layer that includes a vine object, and display the object layers accordingly.

Figure 6A:
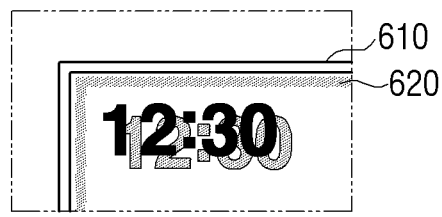

As illustrated for example in FIG. 6A, the display apparatus 100 may further include a bezel that is disposed on the edge of the display 120 and an external frame 610 that covers the bezel. In this case, the processor 130 may further generate an external frame shadow layer with respect to a shadow of the external frame 610, and as illustrate din FIG. 6A, control the display 120 to display a content screen that includes the shadow 620 of the external frame 610.

Figure 6B:
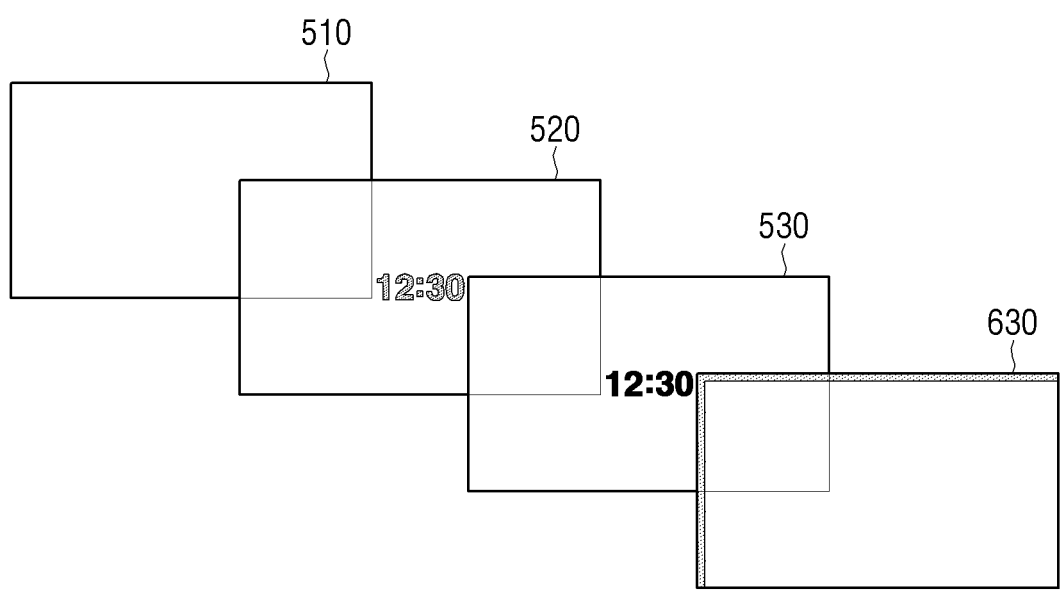
Figure 6C:
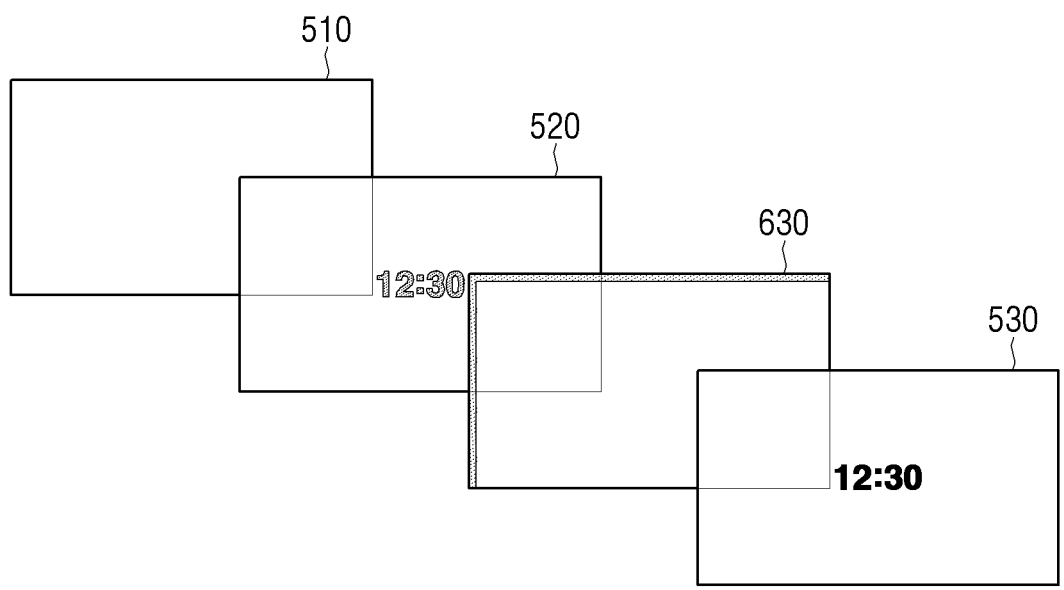

In this case, the processor 130 may control the display 120 to arrange the background image layer 510, the shadow layer 520, the object layer 530, and the external frame shadow layer 630 in the forward order and display them accordingly. That is, as illustrated in FIG. 6B, while the external frame shadow layer 630 is arranged at the top, or the front, when the shadow 620 of the external frame overlaps with the graphic object, the shadow 620 of the external frame appears as if it were in front of the graphic object, providing a realistic glass window effect.

In another example embodiment, the processor 130 may control the display 120 to arrange in the background image layer 510, the shadow layer 520, the external frame shadow layer 630, and the object layer 530, in order from top to bottom, and display them accordingly.

In addition, the processor 130 may perform image processing with respect to a background image, a graphic object, and a shadow of the graphic object included in the content screen, based on the sensing data acquired from the luminance sensor.

Specifically, the processor 130 may generate a shadow of the graphic object included in the content screen or a shadow of the external frame based on a direction of external light acquired from the luminance sensor. For example, a direction of the shadow of the graphic object included in the content screen or a direction of the shadow of the external frame may be changed according to a change of direction of sunlight acquired from the luminance sensor.

In addition, the processor 130 may perform brightness adjustment with respect to a background image, a graphic object, and a shadow of the graphic object included in the content screen based on the brightness of external light acquired from the luminance sensor.

In addition, the processor 130 may generate a content screen based on a user position that is determined based on the sensing data acquired from at least one sensor 110, and control the display 120 to display the generated content screen. For example, the processor 130 may change at least one from among a background image and at least one graphic object in response to a change of the user position.

Figure 7A:
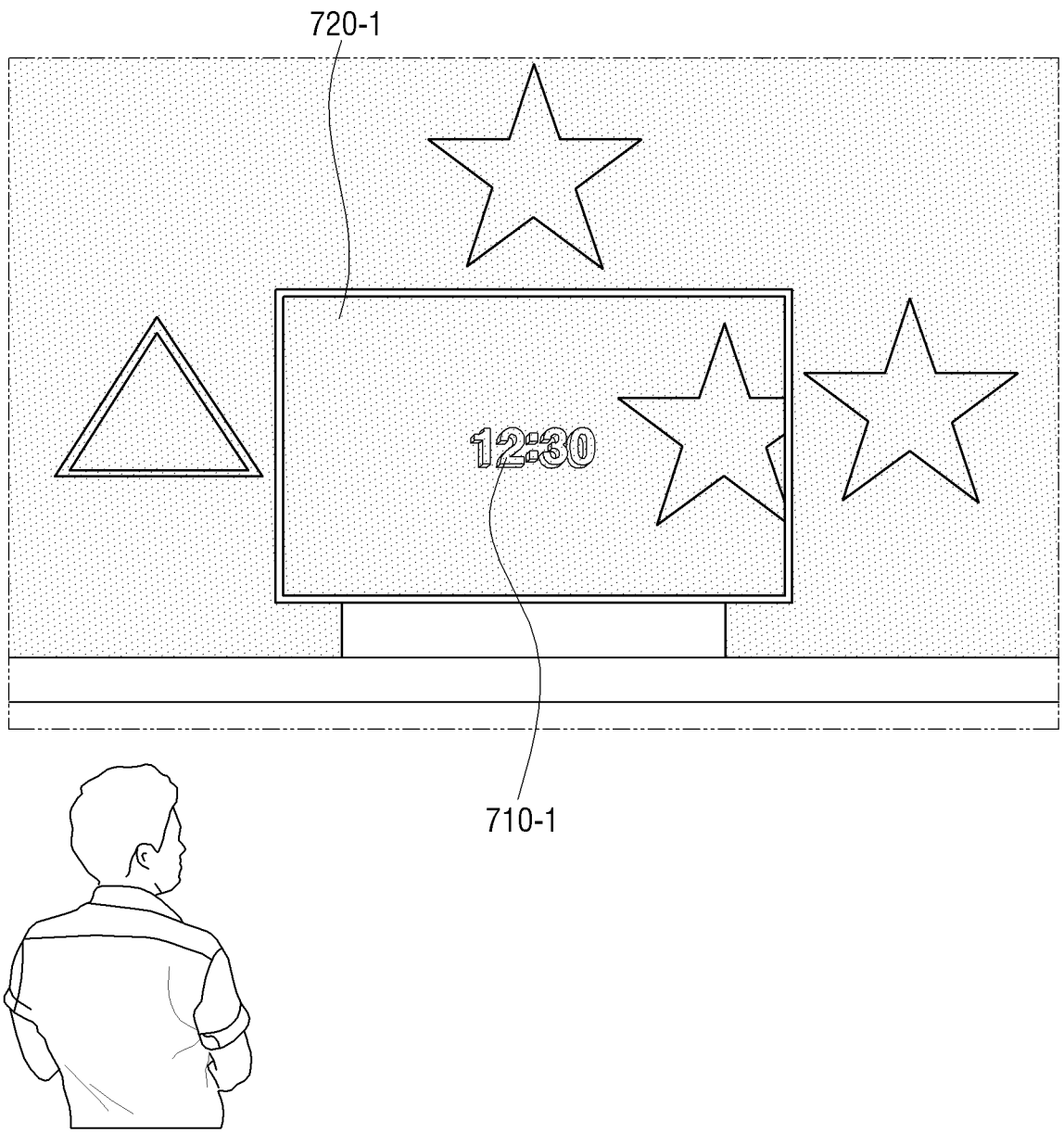

Specifically, the processor 130 may control the display 120 to change an appearance of a graphic object according to a user position. As illustrated in FIG. 7A, when it is sensed that the user is located on the left side of the display apparatus 100, the processor 130 may control the display 120 to display the left side of the graphic object 710-1, and may, when the user sees the left side of the background image 720-1, control the display 120 to include a right area behind the display apparatus 100, for example, a pattern or an object positioned on the right side of the rear side of the display apparatus 100, and display it so that the background image 720-1 matches with the background area to the rear of the display apparatus 100.

Figure 7B:
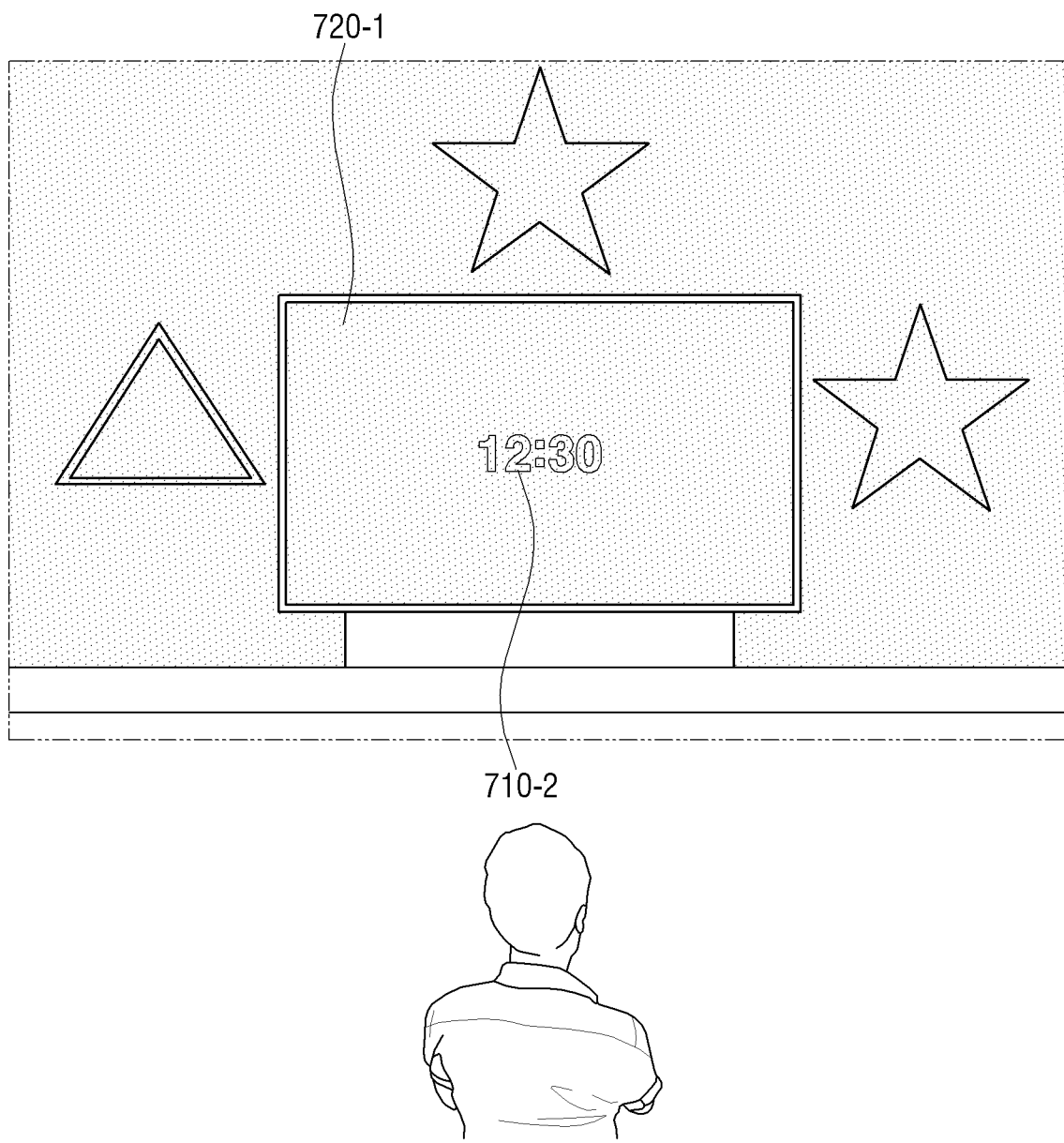

In addition, as illustrated in FIG. 7B, when it is sensed that the user is positioned in front of the display apparatus 100, the processor may control the display 120 to display the front side of the graphic object 710-2, and may, when the user sees the front side of the background image 720-1, control the display 120 to include an area directly behind the display apparatus 100 and display it, so that the background image 720-1 matches with the background area to the rear of the display apparatus 100.

Figure 7C:
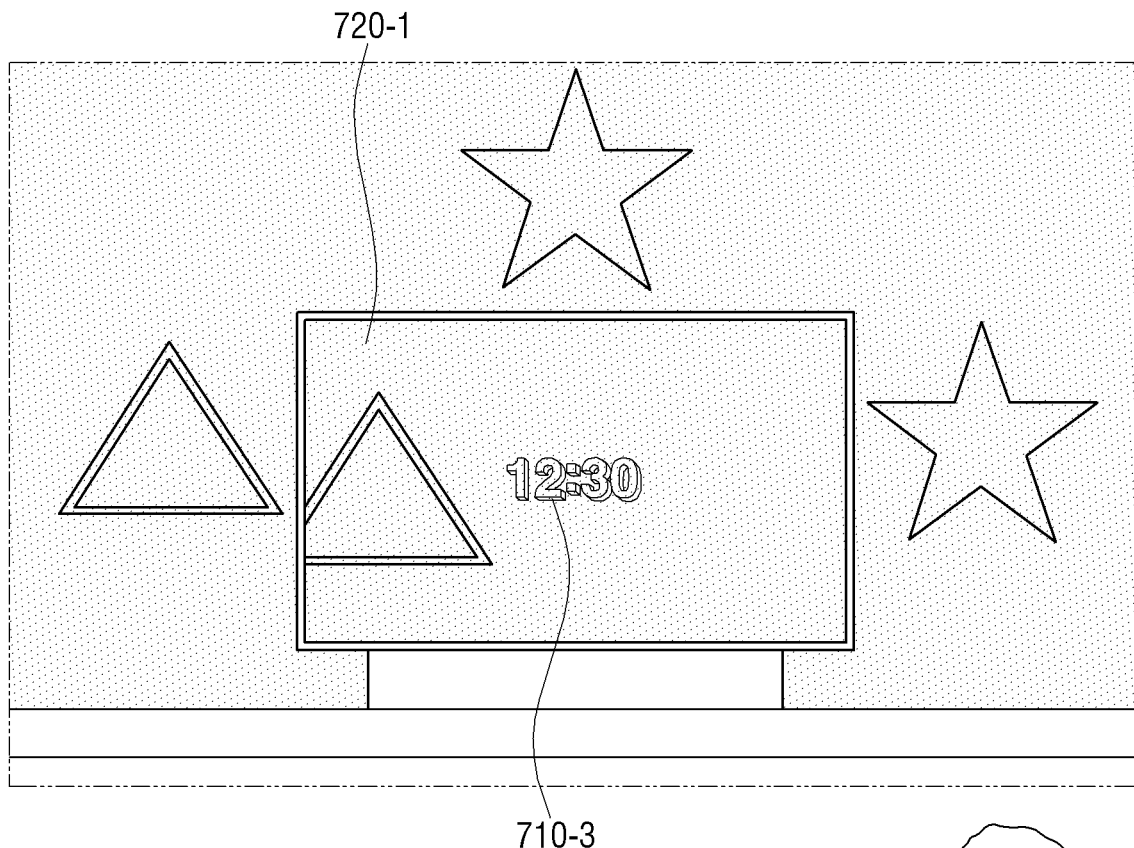
Figure 7C:
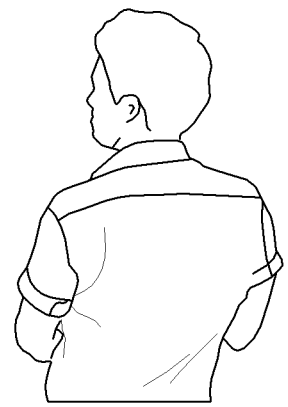

As illustrated in FIG. 7C, when it is sensed that the user is located on the right side of the display apparatus 100, the processor 130 may control the display 120 to display the right side of the graphic object 710-3, and may, when the user sees the left side of the background image 720-1, control the display 120 to include a left area behind the display apparatus 100, for example, a pattern or an object positioned on the left side of the rear side of the display apparatus 100, and display it so that the background image 720-1 matches with the background area to the rear of the display apparatus 100.

That is, the processor 130 may process a graphic object according to a user position with respect to the background image and display it, thereby controlling an effect as if the graphic object is floating in the air. In addition, by processing the background image to display a different area to the rear of, or behind, the display apparatus, an image effect as if the user could see behind the display apparatus 100 through a transparent window according to a user position can be provided.

According to an example embodiment, the processor 130 may process a graphic object differently based on a distance between the user and the display apparatus 100 and provide it to the display 120.

The processor 130 may receive location information acquired from the GPS of the portable terminal of the user and determine whether the user is located within a predetermined distance from the display apparatus 100. When it is determined that the user is located within a predetermined distance from the display apparatus 100, the processor 130 may turn on or activate the display 120. In this regard, the processor 130 may control the display 120 to be operated in the second operation mode.

Figure 8:
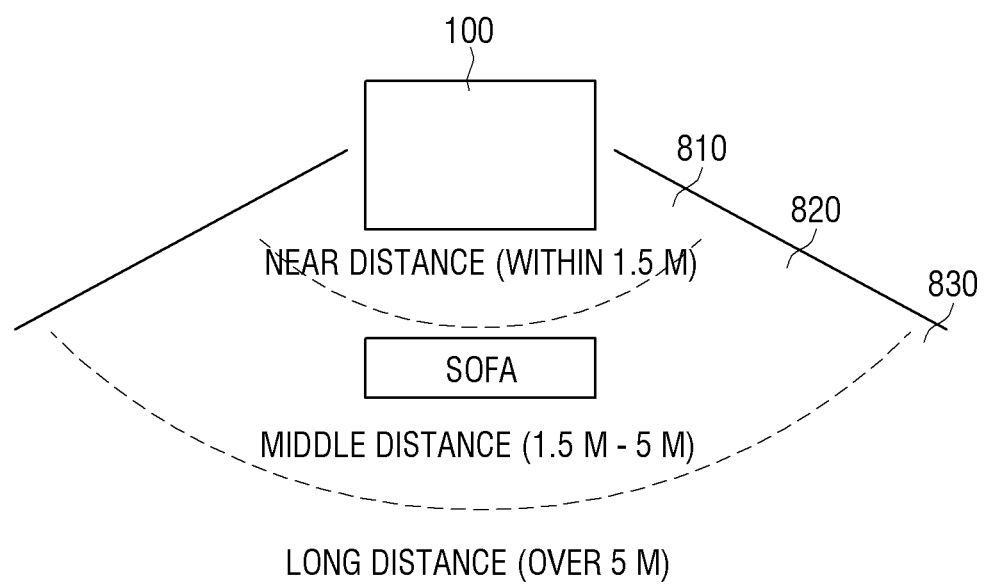

In addition, as illustrated in FIG. 8, the processor 130 may be operated differently according to whether the user is positioned at a near distance 810, a middle distance 820, or a long distance 830 from the display apparatus 100. In an example embodiment, at the near distance 810, a distance between the user and the display apparatus 100 may be less than or equal to 1.5 m, and at the middle distance 820, a distance between the user and the display apparatus 100 may be between 1.5 m and 5 m. In an example embodiment, at the long distance 830, a distance between the user and the display apparatus 100 may be longer than 5 m.

When the user is moved within the near distance 810, the processor 130 may change at least one of a position, color and size of the at least one graphic object and control the display 120 to display the content screen.

Figure 9A:
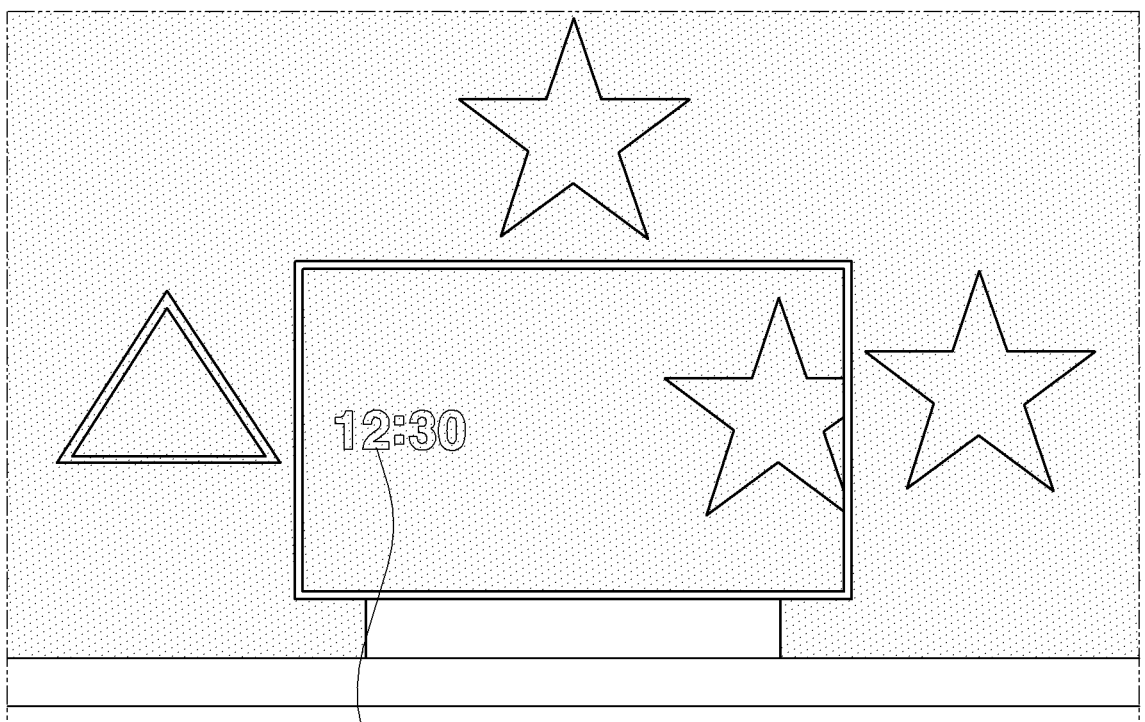
Figure 9A:
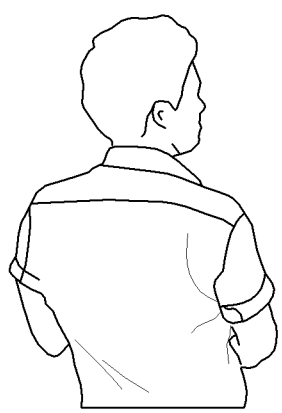
Figure 9B:
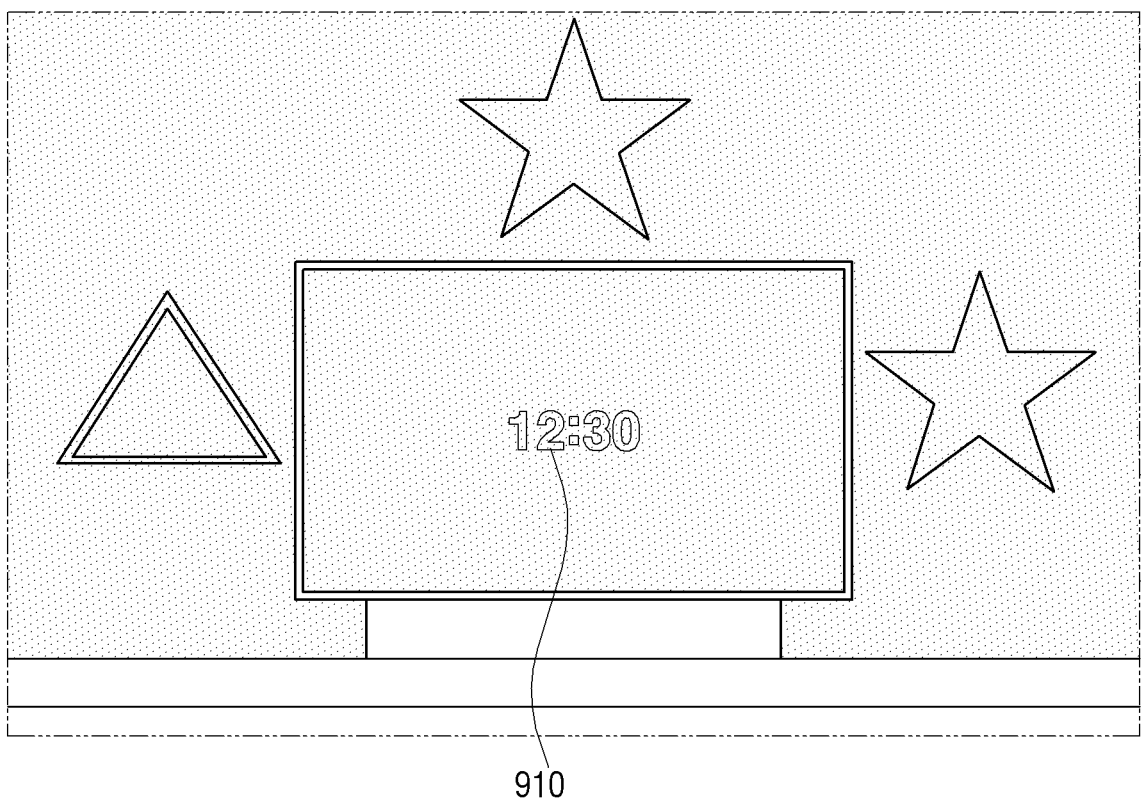
Figure 9B:
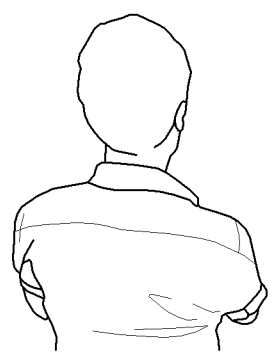
Figure 9C:
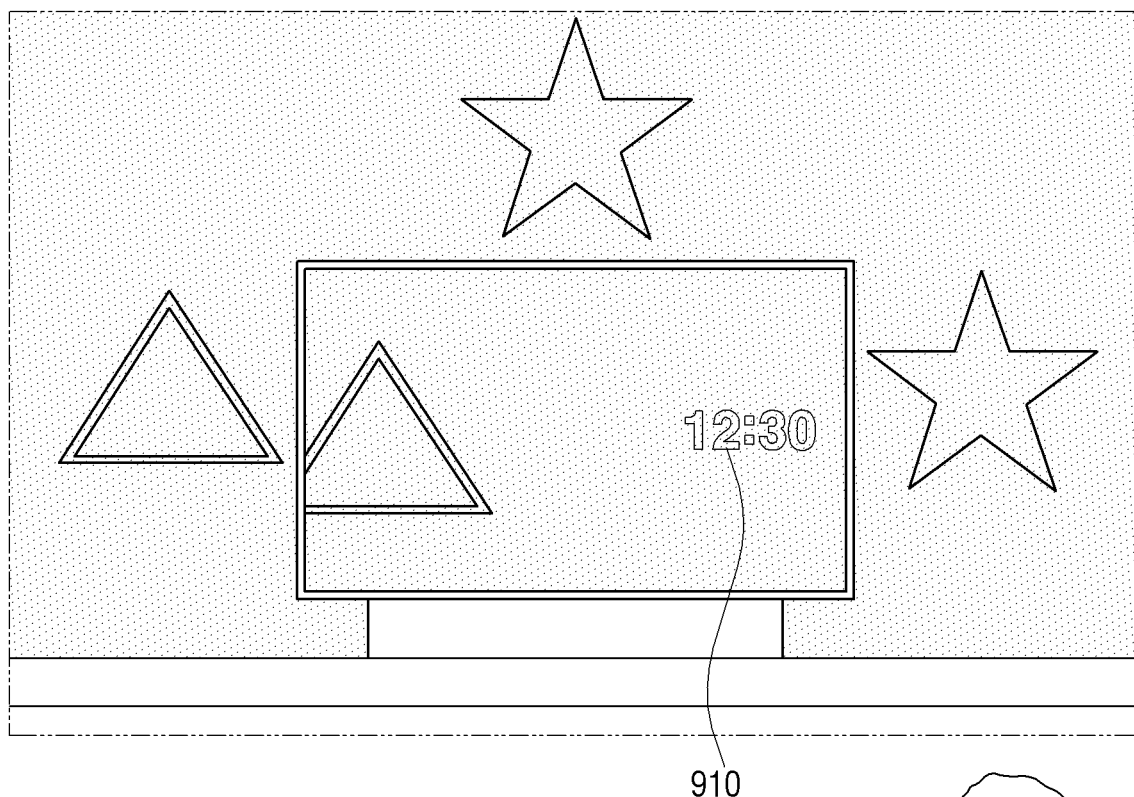
Figure 9C:

For example, as illustrated in FIGS. 9A through 9C, in response to the user moving slowly from the left to right, the processor 130 may control the display 120 to display the graphic object as moving from the left to right according to the movement of the user as well. That is, the processor 130 can provide an image effect as if the graphic object were moved according to the movement of the user.

Furthermore, when the user is moved slowly from the left to right, the processor 130 may control the display 120 in such a manner that the area to the rear of, or behind, the display apparatus 100 displayed on the background image is moved according to the movement of the user and displayed accordingly. That is, the processor 130 may provide an image effect that gives the viewer a feeling that he or she sees behind the display apparatus 100 regardless of the user position.

In this regard, the processor 130 may determine a moving speed of the graphic object according to the speed of user movement. That is, the processor 130 may control the display 120 to display the graphic object to be moved in response to the movement of the user.

As another example, the processor 130 may control the display 120 to vividly change a color of the graphic object or increase the size of the graphic object as the user gets farther away from the display apparatus 100. As another example, the processor 130 may control the display 120 to softly change a color of the graphic object or reduce the size of the graphic object as the user gets closer to the display apparatus 100.

In addition, when it is determined via the sensing data that the user has moved within the near distance 810, the processor 130 may control the display 120 to remove at least a part of at least one graphic object according to the movement of the user and display the graphic object accordingly.

Figure 10A:
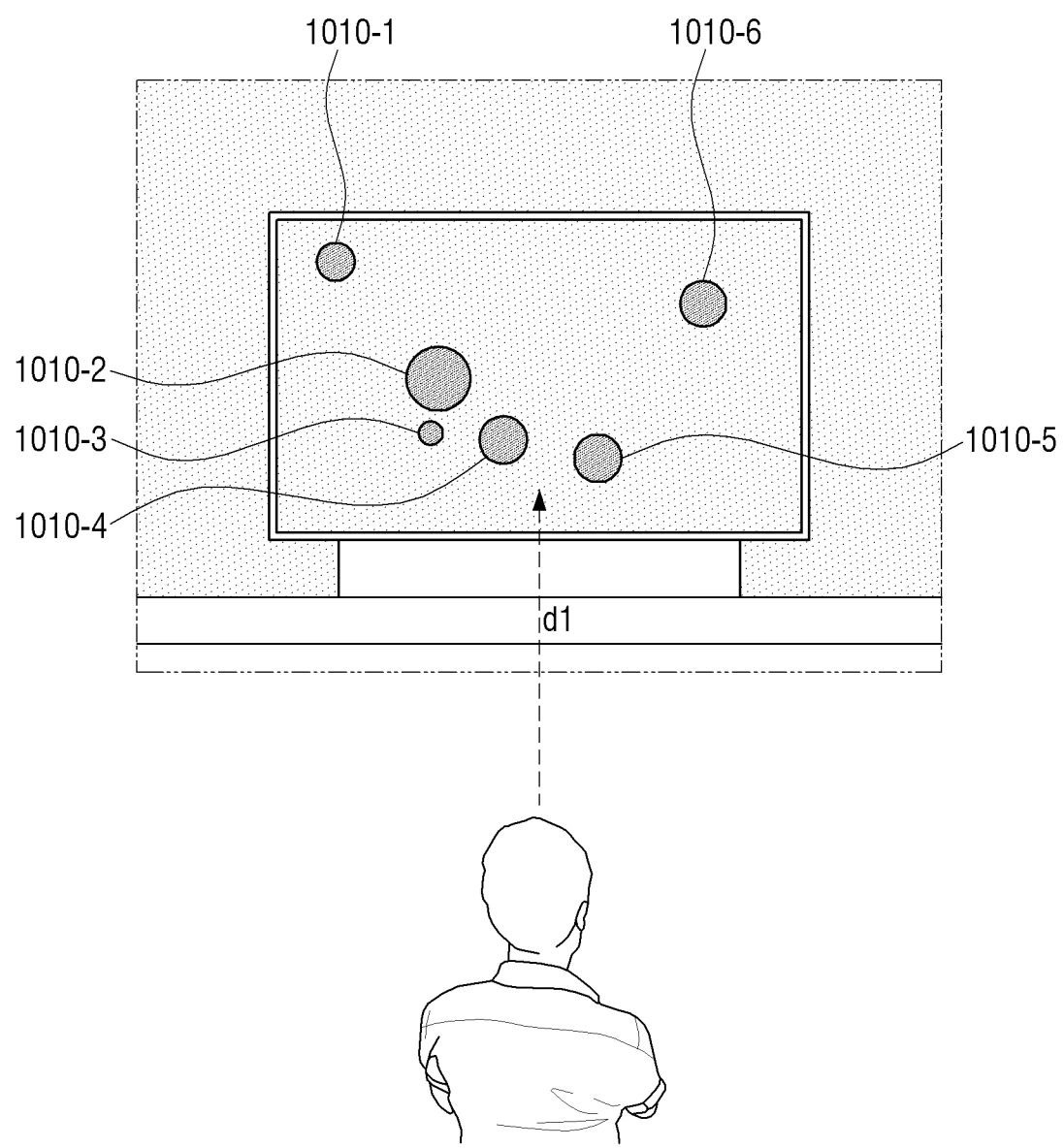
Figure 10B:
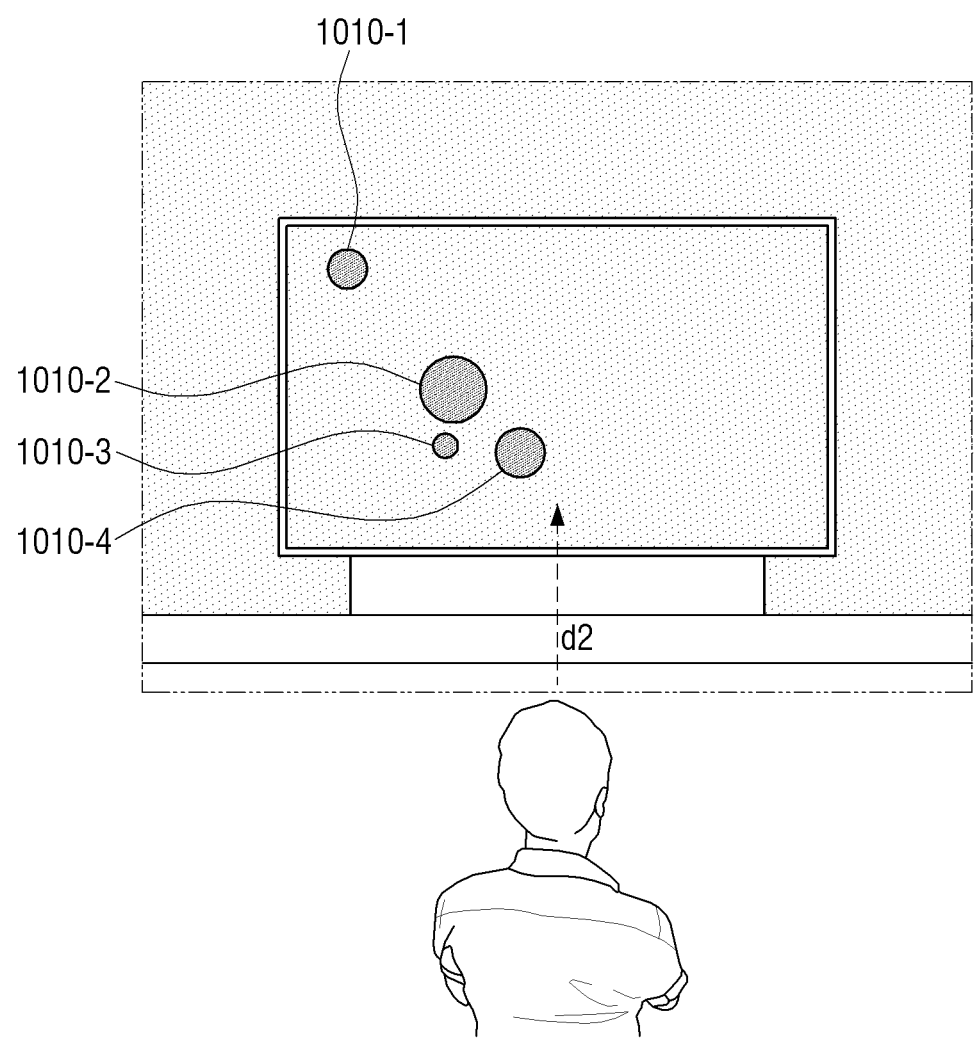

For example, when a distance between the display apparatus 100 and the user is a first distance d1, the processor 130 may control the display 120 to display a plurality of graphic objects 1010-1, 1010-2, 1010-3, 1010-4, 1010-5, and 1010-6 as illustrated in FIG. 10A. However, when a distance between the display apparatus 100 and the user is a second distance d2, which is shorter than the first distance d1, that is, when the user is moved toward the display apparatus 100, the processor 130 may control the display 120 to remove the fifth graphic object 1010-5 and the sixth graphic object 1010-6 from among the plurality of objects 1010-1 to 1010-6, and display the remaining graphic objects 1010-1, 1010-2, 1010-3, and 1010-4. That is, as the user gets closer to the display apparatus 100, a graphic effect as if the graphic object enters the wall can be provided.

In this regard, the number of graphic objects that are removed may be proportional to a distance between the user and the display apparatus 100. That is, as the user gets closer to the display apparatus 100, the number of graphic objects may be decreased.

In addition, when it is determined via the sensing data that the user has moved within the near distance 810, the processor 130 may control the display 120 to change at least a part of at least one graphic object to a different graphic object according to the movement of the user and display it.

Figure 10C:
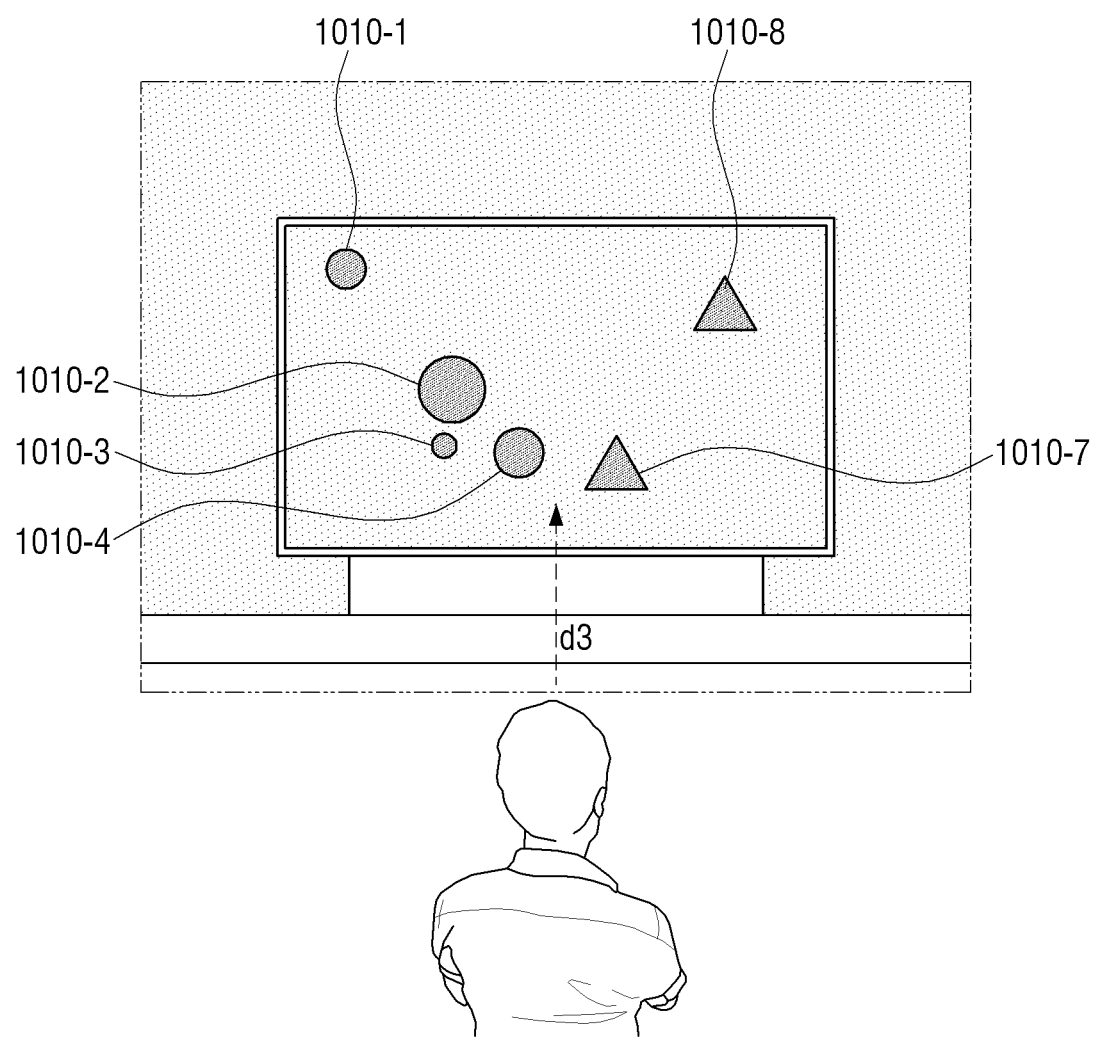

For example, when a distance between the display apparatus 100 and the user is a first distance d1, the processor 130 may control the display 120 to display a plurality of graphic objects 1010-1 through 1010-6 as illustrated in FIG. 10A. However, when a distance between the display apparatus 100 and the user is a third distance d3, which is shorter than the first distance d1, that is, when the user moves toward the display apparatus 100, the processor 130 may, as illustrated in FIG. 10C, change the fifth graphic object 1010-5 to the seventh graphic object 1010-7, and change the sixth graphic object 1010-6 to the eighth graphic object 1010-8, and control the display them. That is, as the user gets closer, graphic objects may be changed to new graphic objects.

In this regard, the number of graphic objects that are changed may be proportional to a distance between the user and the display apparatus 100. That is, as the user gets closer to the display apparatus 100, the number of graphic objects that are changed may be increased.

Figure 11A:
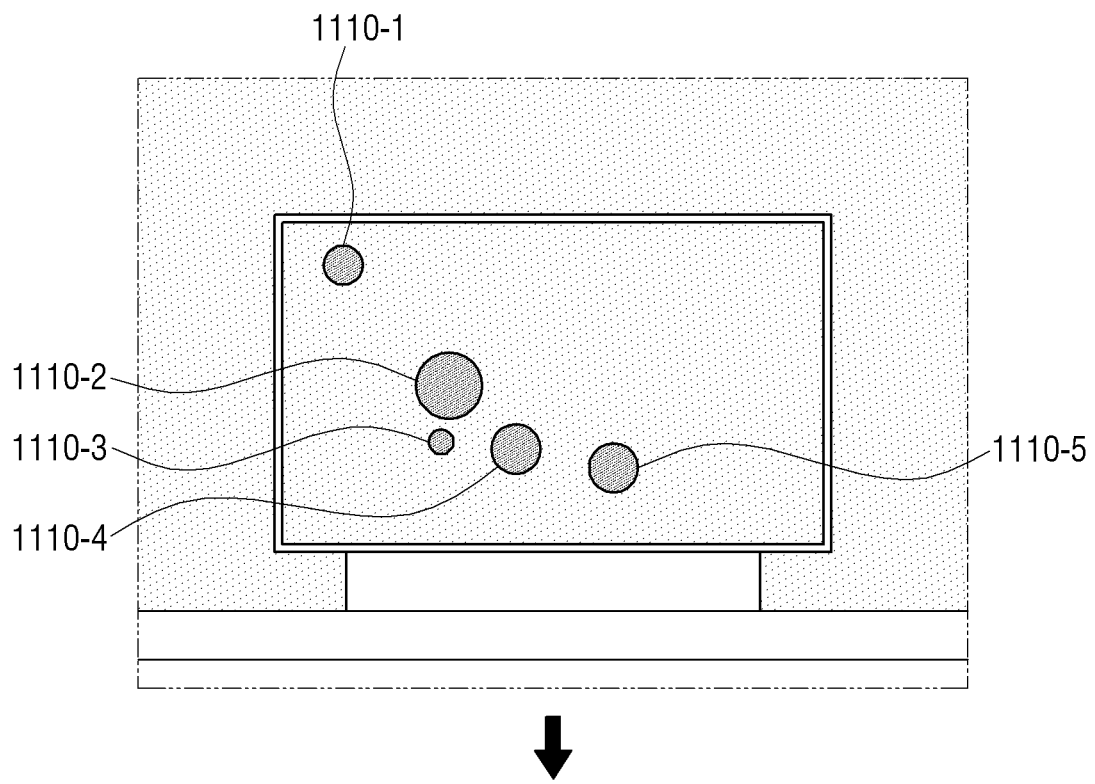
Figure 11B:
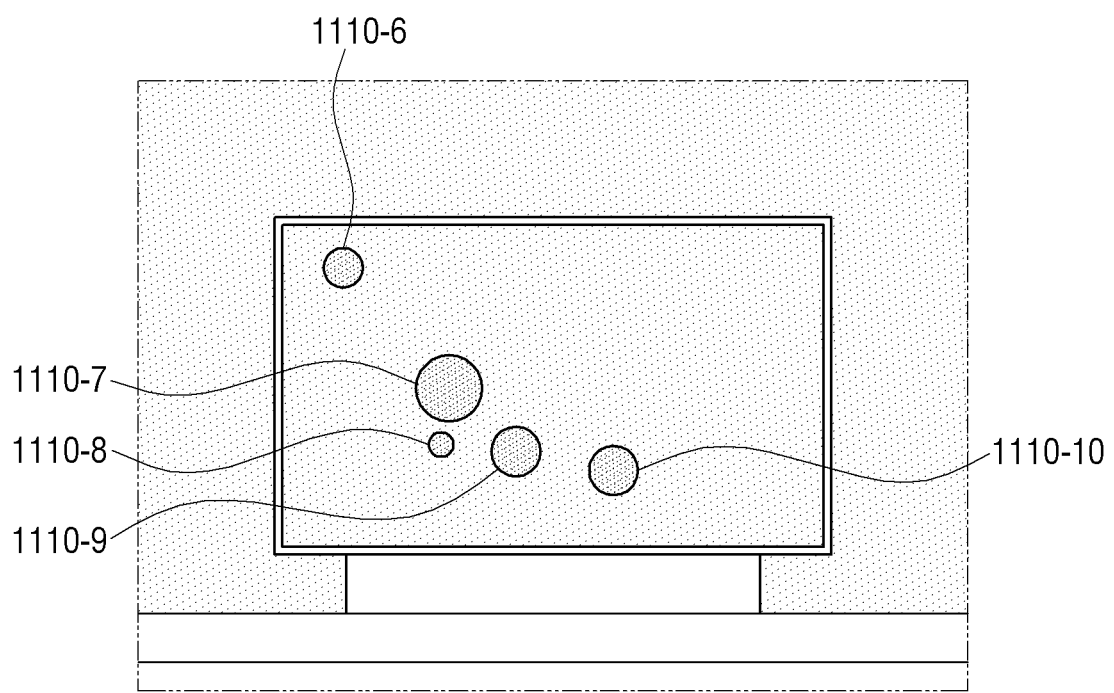

Further, when the user is positioned within the near distance 810, the processor 130 may determine a color of the graphic object according to whether the user gazes at it. Specifically, when it is detected that the user gazes at the display 120, the processor 130 may, as illustrated in FIG. 11A, control the display 120 to display a plurality of graphic objects 1110-1, 1110-2, 1110-3, 1110-4, and 1110-5 of a first color. When it is detected that the user gazes at a place other than the display 120, the processor 130 may, as illustrated in FIG. 11B, control the display 120 to display a plurality of graphic objects 1110-5, 1110-6, 1110-7, 1110-8, 1110-9, and 1110-10 of a second color. In this regard, the second color may be a color that has a lower chroma or lower brightness than the first color.

Figure 12:
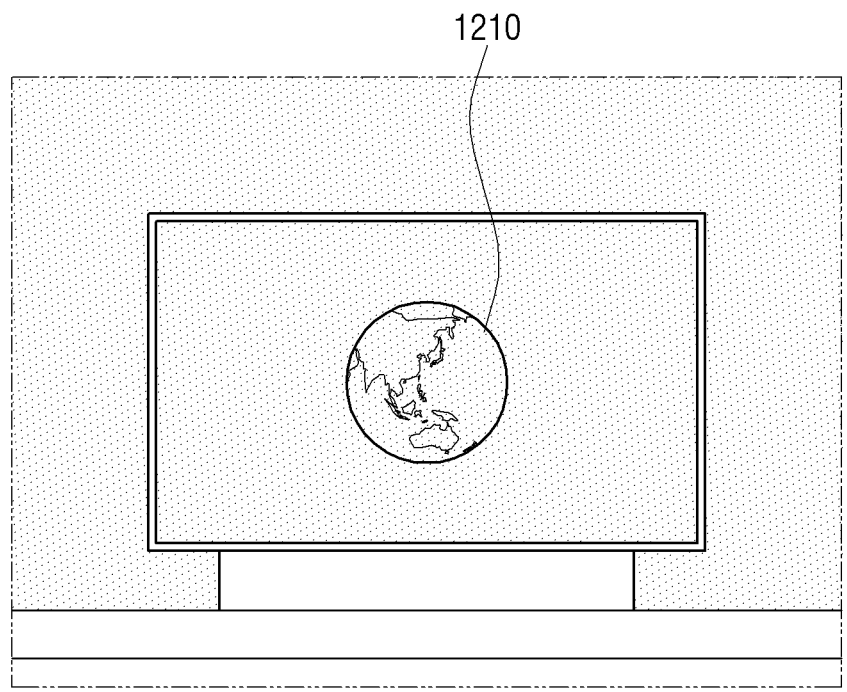
Figure 12:
Figure 12:
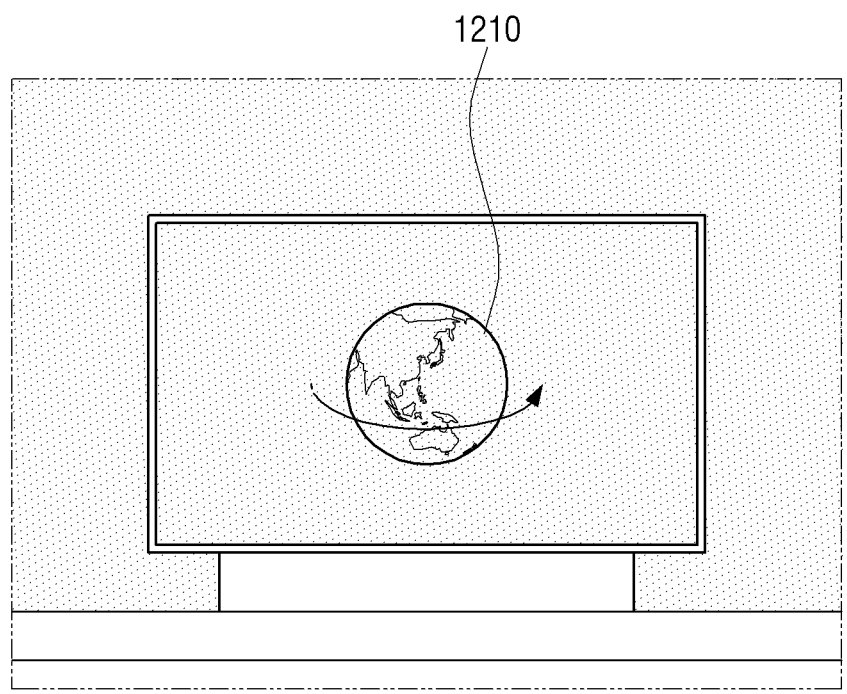

In addition, when the user is positioned within the near distance 810, when a user input is sensed while at least one graphic object is displayed, the processor 130 may, as illustrated in FIG. 12, control the display 120 to rotate the at least one graphic object according to the user input and display the content screen. In this regard, the user input may be one of a user motion or a user voice, but this is only an example. The user input may include various user inputs, such as a pointing device, a user touch, and the like.

Figure 13A:
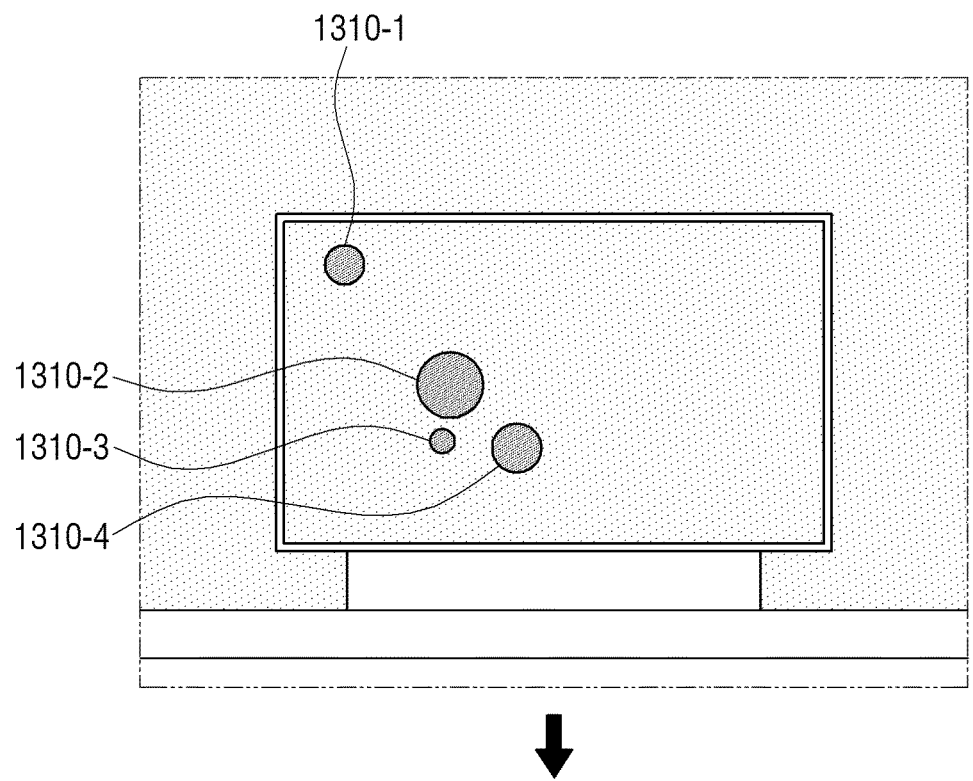
Figure 13B:
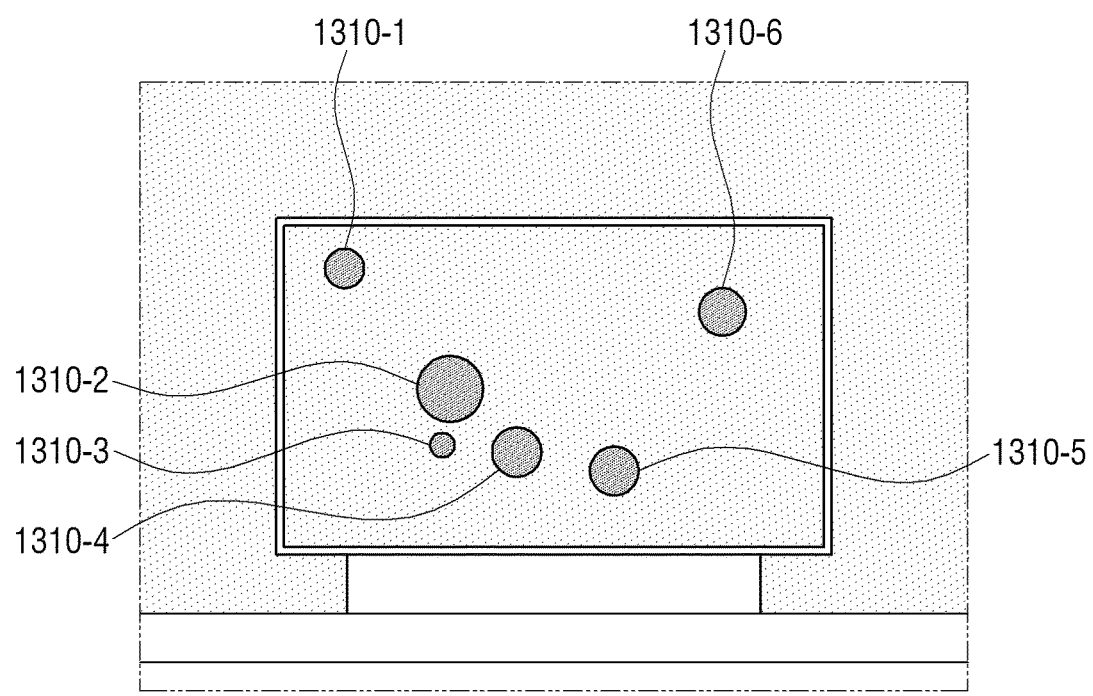

In addition, when the user is positioned within the middle distance 820, the processor 130 may control the number of graphic objects that are displayed according to the user input. For example, as illustrated in FIG. 13A, while four graphic objects 1310-1, 1310-2, 1310-3 and 1310-4 are displayed, when a user input, for example, user voice, user clap, and the like, is sensed, the processor 130 may control the display 120 to display six graphic objects 1310-1 to 1310-4 in addition to 1310-5 and 1310-6 according to the user input. In this regard, the number of objects that are increased is determined based on a user input, as illustrated in FIG. 13B. For example, when the user claps twice or utters a particular keyword twice, the processor 130 may increase the number of graphic objects by two.

In addition, when the user is positioned within the middle distance 820, the processor 130 may control the display 120 to change a color of motion of the graphic object according to a time period and display it.

Figure 14A:
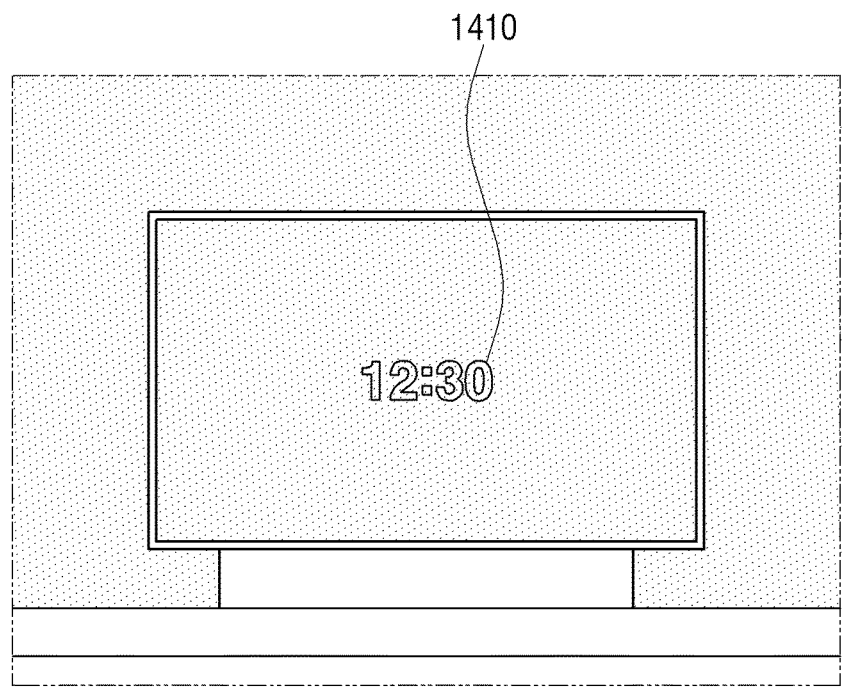
Figure 14A:
Figure 14B:
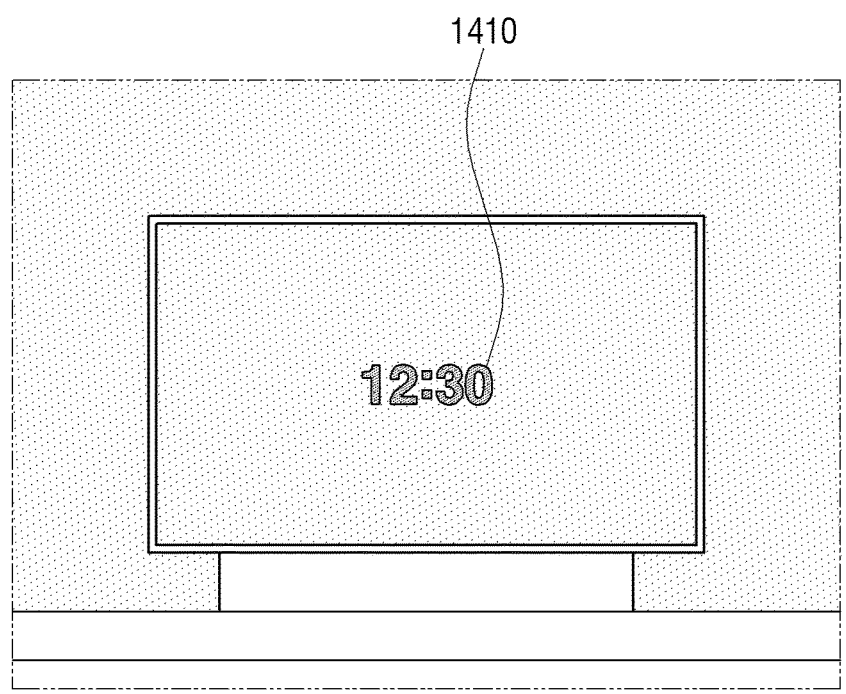

For example, the processor 130 may control the display 120 to display a bright graphic object 1410 during the day as illustrated in t FIG. 14A, and control the display 120 to display a dark graphic object 1420 during the night as illustrated in FIG. 14B. As another example, the processor 130 may control the display 120 to display a graphic object as moving from the right area to the left area according to the flow of time.

Figure 15A:
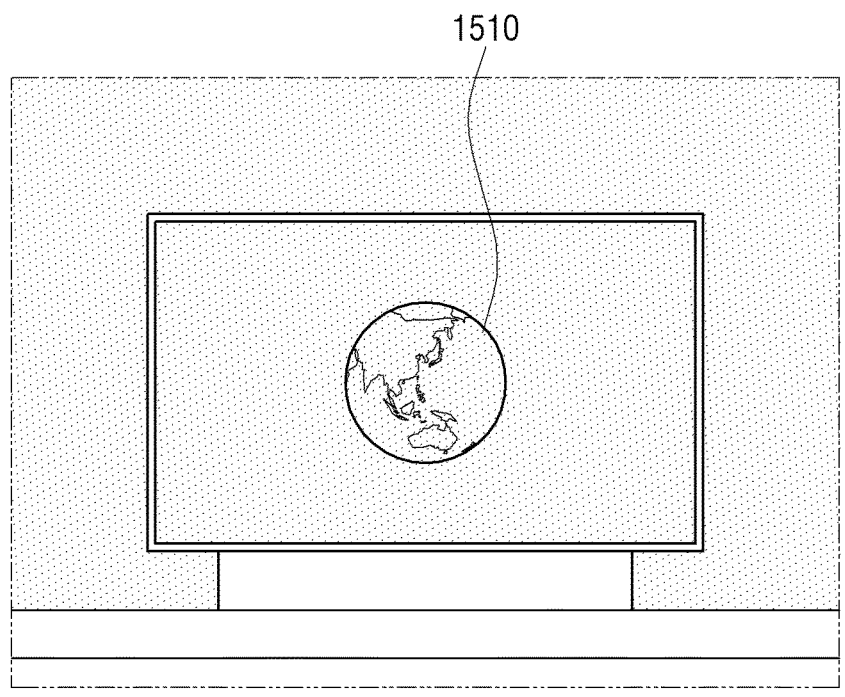
Figure 15A:
Figure 15B:
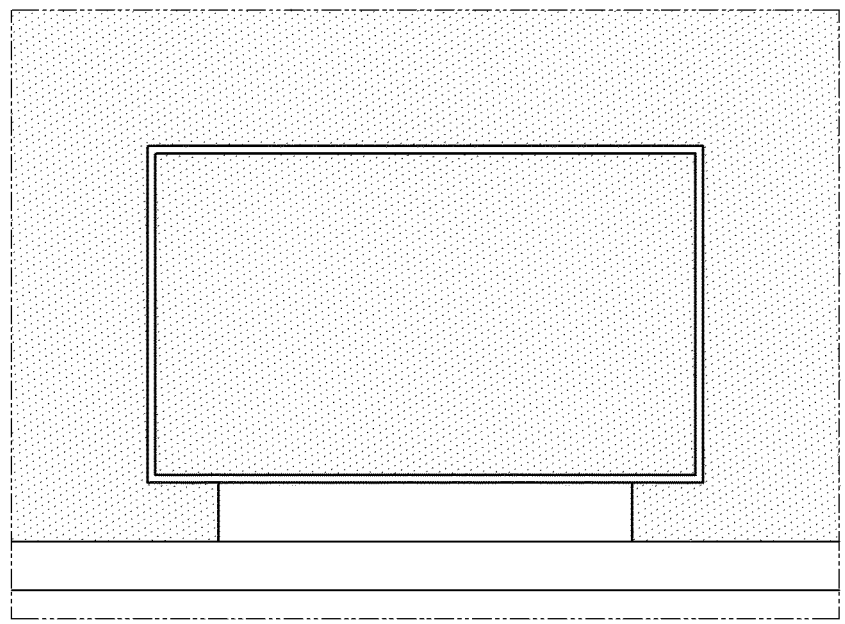

In particular, when the user is positioned in the long distance 830, as illustrated in FIG. 15A, when a user input, for example, user voice, input via a smartphone, is sensed while a graphic object 1510 is displayed, the processor 130 may control the display 120 to remove the graphic object 1510 and display a content screen that includes a background image only according to the user input as illustrated in the FIG. 15B.

In addition, when it is determined through the sensing data that the user is not present in a peripheral area of the display apparatus 100, the processor 130 may turn off the display 120. In this regard, the processor 130 may turn off the display 120 after displaying a content screen that includes a background screen only for a predetermined time, but this is only an example. If the user disappears, the processor 130 may immediately turn off the display 120.

In example embodiments described above, a graphic object is changed and displayed according to a user position, but this is only an example. At least one from among a background image and a graphic object may be changed according to a user position.

For example, the processor 130 may control the display 120 to change a brightness of the background image according to the movement of the user determined by the sensing data and display the content screen. For example, when the user is moved to a bright area, the processor 130 may increase a brightness of a background image according to the movement of the user, and when the user is moved to a dark area, the processor 130 may control the display 120 to display a content screen by reducing a brightness of a background image according to the movement of the user.

That is, the processor 130 may adjust a brightness of a background image so that the background image appears to be the same as an area to the rear of, or behind, the display apparatus 100 irrespective of a user position.

In addition, the processor 130 may control the display 120 to display a content screen by changing a shadow of at least one graphic object according to a change of at least one graphic object corresponding to the movement of the user. For example, when at least one graphic object is moved or a size thereof is changed according to the movement of the user, the processor 130 may control display 120 to display a shadow corresponding to a position or size of the changed graphic object.

Figure 16:
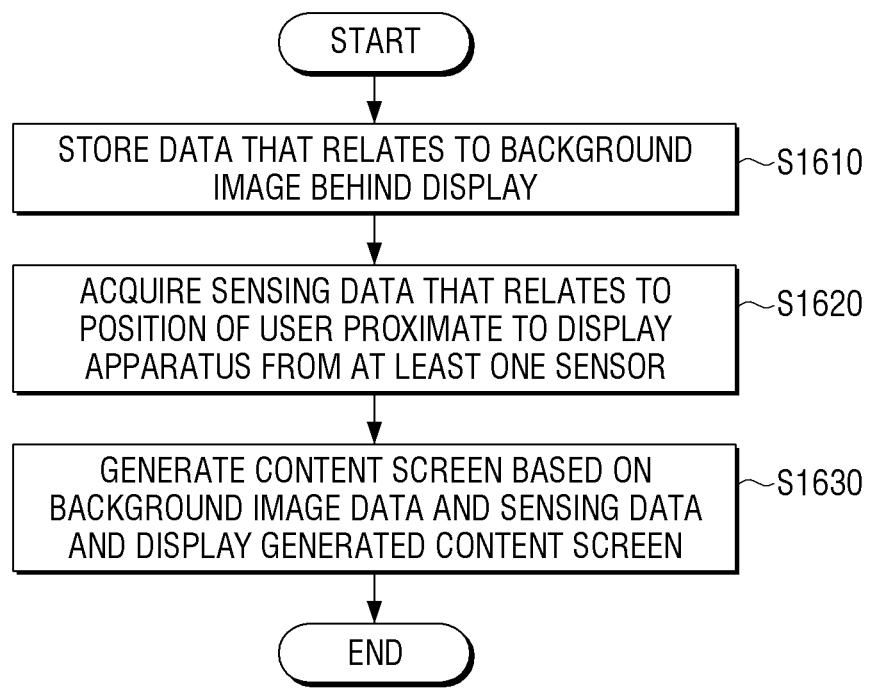
FIG. 16 is a flowchart illustrating a method for controlling a display apparatus, according to an example embodiment.

FIG. 16 is a diagram illustrating a method for controlling a display apparatus, according to an example embodiment.

First, the display apparatus 100 stores data that relates to a background image to the rear of the display 120, at operation S1610. In this case, the background image data may be acquired by an external portable terminal or a camera that is connected with the display apparatus 100.

In addition, the display apparatus 100 acquires sensing data that relates to a position of the user in a peripheral area of, or proximate to, the display apparatus 100 from at least one sensor 110, at operation S1620. In this regard, the display apparatus 100 may sense a user position using a photographing element that has an angle of view of at least 180 degrees.

In addition, the display apparatus 100 may generate a content screen based on the background image data and the sensing data, and display the same, at operation S1630. In this regard, the content screen may include a graphic object and a shadow of the graphic object on the background image. In addition, the background image and the graphic object may be changed according to a user position that is determined from the acquired sensing data.

According to various example embodiments described above, a user can be provided with a content screen including a background image adaptively changed according to a location of the user even if the user does not use a transparent display. Thus, the user can receive the same or similar visual effect as if the graphic object included in the content screen is floating in the air.

Below, another example embodiment in which different view angle processing is performed with respect to a background and an object is described with reference to the accompanying drawings.

Figure 17:
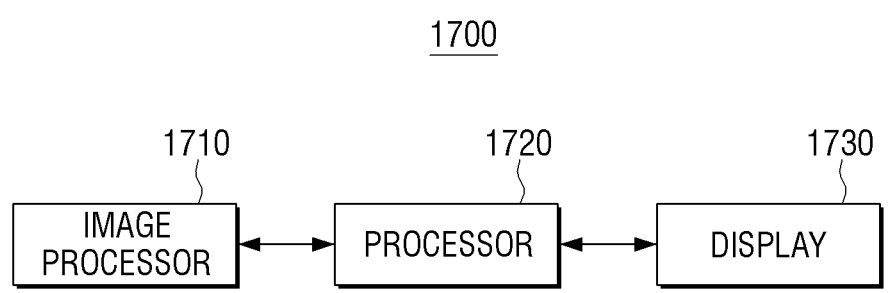
FIG. 17 is a block diagram illustrating a structure of a display apparatus, according to another example embodiment.

FIG. 17 is a block diagram briefly illustrating a structure of a display apparatus 1700, according to an example embodiment.

Referring to FIG. 17, the display apparatus 1700 includes an image processor 1710, a processor 1720, and a display 1730.

The image processor 1710 may generate a graphical user interface (GUI) for the user. Such a GUI may be an on screen display (OSD), and the image processor 1710 may include a digital signal processor (DSP).

Further, the image processor 1710 may add the generated GUI to an image that is output from the A/V processor 150. In addition, the image processor 1710 provides an image signal corresponding to an image, to which a GUI is added, to the display 1730. Accordingly, the display 1730 displays information provided from the display apparatus 1700 and an image transmitted from the image signal provider 160.

In addition, the image processor 1710 may receive a main image, for example, background image or content screen, as one layer, or content screen layer and background image layer, receive an image generated from the A/V processor 150 or an object image provided from the processor 1720 as another layer, or object layer, and output one of the two layers, or synthesize, or mix, the two layers and provide the synthesized layers, to the display 1730.

In this case, different image processing may be performed with respect to the two layers, that is, object image and main image, that are received. Specifically, the image processor 1710 may perform image processing differently with respect to the object image and main image that are received. In this regard, the image processing may be a view angle improvement processing, and the image processor 1710 may perform a view angle improvement processing with respect to the object image, and not to the main image.

In addition, the image processor 1710 may perform a follow-up image quality processing with respect to the combined image. In addition, the image processor 1710 may extract brightness information corresponding to an image signal, and generate one dimming signal, for example when the display apparatus is operated by global dimming, or a plurality of dimming signals, for example when the display apparatus is operated by local dimming, that correspond to the extracted brightness information. In this regard, the image signal provider 160 may generate the dimming signal described above in consideration of a lighting environment that is sensed by the at least one sensor 110. Such a dimming signal may be a PWM signal.

When different image quality processing, or view angle improvement processing, is performed with respect to two images and the two images are synthesized, an image that is synthesized after synthesizing two images may be divided into at least two areas, and different image processing, or view angle improvement processing, may be performed for each of the divided areas.

An example of a view angle improvement processing method will be described below with reference to FIG. 24.

The display 1730 displays an image. In particular, the display 1730 may display a background image and an object image to which different view angle processing is performed by the image processor 1710.

The processor 1720 controls overall operations of the display apparatus 1700. For example, the processor 1720 determines the operation mode of the display apparatus 1700. Specifically, when a TV display command or a content display command is received, the processor 1720 may determine a first operation mode that displays a normal image. In the first operation mode, when a power command or a command to change an operation mode is input, the processor 1720 may determine the display apparatus 1700 to be operated in the second operation mode that displays a background image. Accordingly, the first operation mode and the second operation mode may be changed according to a normal power operation of the user, according to an example embodiment.

In addition, when the display apparatus 1700 is operated in the first operation mode or the second operation mode, when the user presses a power button for a predetermined time, the processor 1720 may switch the mode to a normal power off mode.

In addition, when a power command is received in the power off mode, the processor 1720 may determine that the display apparatus 1700 is operated in an operation mode that was used immediately before the power off.

When it is determined that an operation mode of the display apparatus 1700 is the first operation mode, the processor 1720 may control the display 1730 to display a content screen according to a control command that is received through the input interface 175.

In this case, when an on screen display (OSD) display command is received from the user, the processor 1720 may control the display 1730 to display a current content screen as a main image and display an OSD as an object image. In this case, the processor 1720 may control the image processor 1710 to apply a view angle improvement processing to the object image, or OSD image, without applying a view angle improvement processing to the main image, or content image.

When it is determined that an operation mode of the display apparatus 1700 is the second operation mode, the processor 1720 may control the display 200 to display the background image. In this regard, the background image may be a photo image corresponding to background area behind a rear surface of the display apparatus 1700, or an image generated through a peripheral image of the display apparatus 1700. In addition, the background image may further include additional graphic images.

In this case, the processor 1720 may control the image processor 1710 to apply a view angle improvement processing to the object image, that is, the additional graphic image, without applying a view angle improvement processing to the main image, that is, the background image.

In addition, the processor 1720 may control at least one sensor 110 to sense a lighting environment of a peripheral area of the display apparatus 1700, and may determine a brightness and direction of the lighting based on the sensed lighting environment.

In addition, the processor 1720 may perform image processing with respect to a background image to be displayed based on the sensed lighting environment, for example a direction and brightness of lighting. Specifically, the processor 1720 may perform image processing that converts a color temperature of a background image based on a color temperature sensed by the at least one sensor 110.

In addition, the processor 1720 may control the display 1730 to display an object together with a background image. Specifically, the processor 1720 may generate a screen that includes a predetermined object and background image, and provide the generated screen to the display 1730. In this regard, the predetermined object may be an analog clock, a digital clock, and the like, and may be various graphic objects including a photo, a picture, a fish tank, and the like. Such a graphic object may be a static graphic object, such as a photo, a picture, and the like, or may be a dynamic graphic object.

In addition, the processor 1720 may determine a lighting direction based on the sensed lighting environment, and control the display 1730 to display a shadow object of the object at a position corresponding to the determined lighting direction. In addition, the processor 1720 may determine a size of the shadow object based on the sensed lighting value and color temperature, and control the display 1730 to display a shadow object having a predetermined size. For example, the shadow object may appear differently according to an intensity of the lighting or a color temperature of the lighting. Accordingly, the display apparatus 1700 according to an example embodiment may generate the shadow object and display it in consideration of the intensity and color temperature of the lighting.

In addition, the processor 1720 may control the image processor 1710 to perform a view angle improvement processing with respect to the object, and not to the background image. A determination of whether to apply such a processing operation may be made based on a user position.

Specifically, the processor 1720 may sense a user position using at least one sensor 110, and may determine that a view angle improvement processing is unnecessary when the user position is the front side. If the sensed position is not the front side, the processor 1720 may determine that it is necessary to perform a view angle improvement processing, and control the image processor 1710 to perform different view angle improvement processing with respect to each of the object image and the background image.

At the time of implementation, the display 1730 may display a plurality of objects. In this case, the processor 1720 may perform the same view angle improvement processing with respect to each of the plurality of objects, or may perform different view angle improvement processing. For example, when a clock and a shadow of the clock are simultaneously displayed at the center of a background image, view angle improvement processing may not be performed with respect to the background image, a low level of view angle improvement processing may be performed with respect to the shadow of the clock, and a high level of view angle improvement processing may be performed with respect to the clock.

In addition, to reduce power consumption when the display apparatus is operated in the second operation mode, the processor 1720 may control the display 1730 to display a background image only when the user is sensed in a peripheral area of the display apparatus 1700. That is, when the user is not sensed in a peripheral area of the display apparatus 1700 in the second operation mode, the processor 1720 may not display a background image.

In addition, in the second operation mode, the processor 1720 may control the display 1730 to be operated at a frame rate that is lower than a frame rate that is operated in the first operation mode. For example, when the display 1730 displays an image at 240 Hz in the first operation mode, the processor 1720 may control the display 1730 to be operated at 120 Hz or 60 Hz, which are slower than the 240 Hz, in the second operation mode.

In addition, when the user is not sensed through at least one sensor 110, the processor 1720 may control the display 1730 not to perform an image display operation.

In addition, the processor 1720 may control the display 1730 to display a corresponding object based on weather information received from the communication interface described above, or may perform a particular event. For example, when rain information is sensed in the weather information, the processor 1720 may control the display 1730 to display a rain object on the background image, and control the audio output interface 155 to output a sound corresponding to rain, such as a raining sound.

The display apparatus 1700 according to the present example embodiment may perform different view angle improvement processing with respect to each of the main image and the object image, and thereby the main image and object image that are displayed may have a different three-dimensional perception to the view angle.

The display apparatus 1700 may further include features illustrated in FIG. 3.

Figure 18:
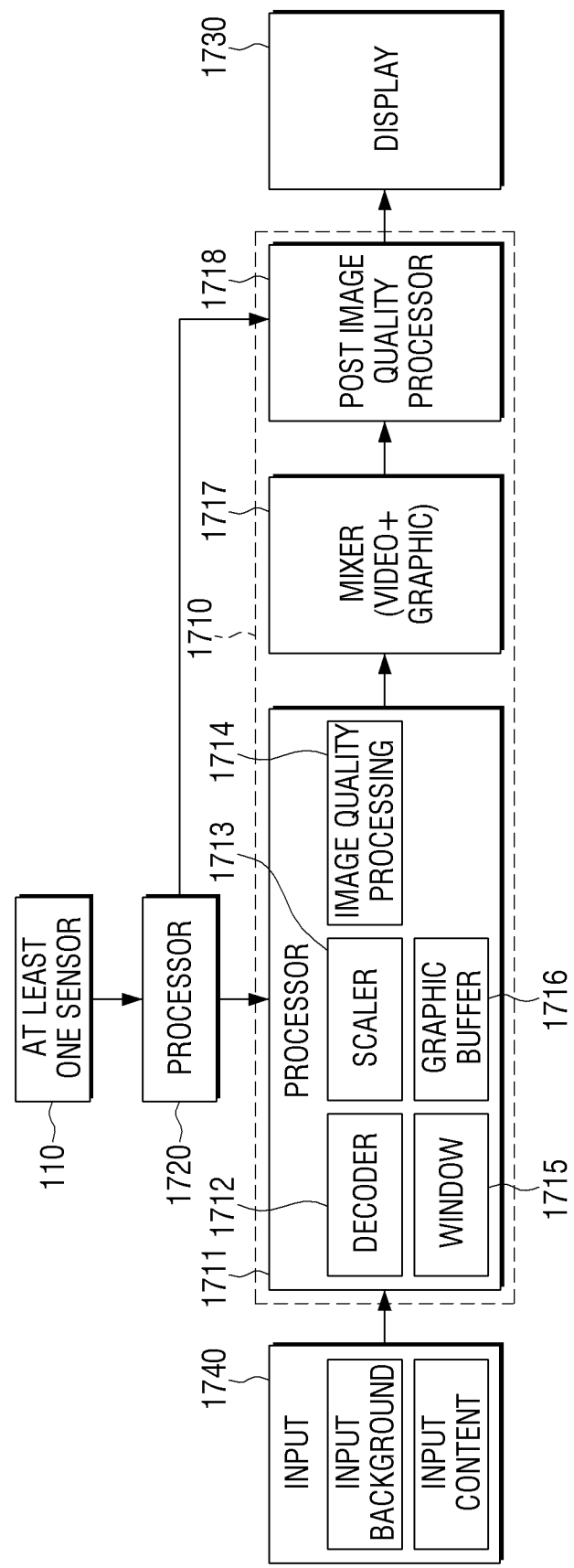
FIG. 18 is a diagram illustrating a configuration of an image processor of FIG. 17, according to an example embodiment.

FIG. 18 is a diagram illustrating a detailed configuration of an image processor, for example image processor 1710 of FIG. 17.

Referring to FIG. 18, the image processor 1710 may include a processor 1711, a mixer 1717, and a rear image quality processor 1718, according to an example embodiment.

The processor 1711 performs image processing with respect to a plurality of video signals. Specifically, the processor 1711 may simultaneously perform image processing with respect to a plurality of layers. The processor 1711 may include a decoder 1712, a scaler 1713, an image quality processor 1714, a window 1715 and a graphic buffer 1716.

First, the processor 1711 identifies whether an attribute of an input image is a video signal or a graphic signal, and when the attribute of the input image is a video signal, process the image by means of the decoder 1712, the scaler 1713 and the image quality processor 1714. For example, when an image having a video attribute is received in the processor 1711 via the input unit 1740, the decoder 1712 decodes the received video image, and the scaler 1713 scales the decoded video image. In addition, the image quality processor 1714 performs image processing with respect to the scaled video image and output it to the mixer 1717. Here, the image having a video attribute may be an image that is received from an external source or an image of a video content pre-stored in the display apparatus.

If the attribute of the input image is a graphic signal, the image is processed by using the window 1715 and the graphic buffer 1716. For example, the processor 1711 may, when an object image, for example, a game image, a background image or an object, having a graphic attribute, is received via the input unit 1740, render a graphic signal to the graphic buffer 1716 via the window 1715, and output the image generated in the graphic buffer 1716 to the mixer 1717.

Accordingly, the processor 1711 may process a plurality of images and thus, a plurality of layers may be processed. In above example embodiments only two signals generated by combining one video signal with one graphic signal are processed. In example embodiments it is possible to process each of the two video signals by means of a plurality of layers. In addition, it is possible to process each of the two graphic signals by means of a plurality of signals. Further, it is also possible to process the signals by means of three layers rather than two.

When a view angle improvement processing is necessary, the image quality processor 1714 may perform view angle improvement processing with respect to an image corresponding to the object image as well.

The mixer 1717 may mix the two images transmitted from the processor 1711 into one image.

In addition, the rear image quality processor 1718 may perform an image processing (W/B) with respect to the mixed image, and transmit the processed image to the display 1730.

In the above example embodiments, different view angle improvement processing is performed with respect to each of the two images and the two images are combined. In example embodiments, it is possible to combine the two images first and then, perform different view angle improvement processing with respect to the combined image. That is, view angle improvement angle is performed only with respect to an area in which the object image is positioned, and thereby the same effect as described above may be added.

Figure 19:
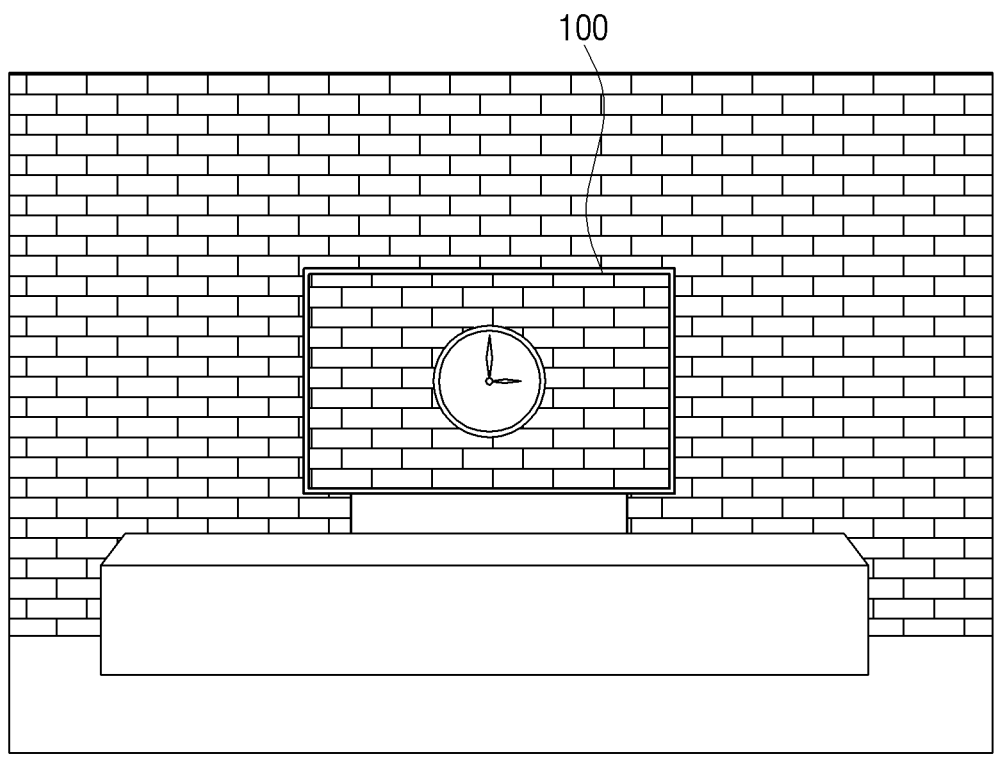
FIG. 19 is a diagram illustrating an example of a display screen that is displayed in a second operation mode, according to an example embodiment.

FIG. 19 is a diagram illustrating an example of a display screen that is displayed when the display apparatus is operated in the operation mode, according to an example embodiment.

Referring to FIG. 19, the display apparatus 1700 is operated in the second operation mode, and displays a background of the display 1730, for example a background area behind the display 1730, as a background image.

In addition, the display 1730 displays a clock object together with the background image.

The viewing angle of the LCD panel may be limited by its operating characteristics. For example, in high grayscale or low grayscale, the viewing angle may be good, but in the middle grayscale, the viewing angle may be poor and a color drop phenomenon appears.

Figure 20:
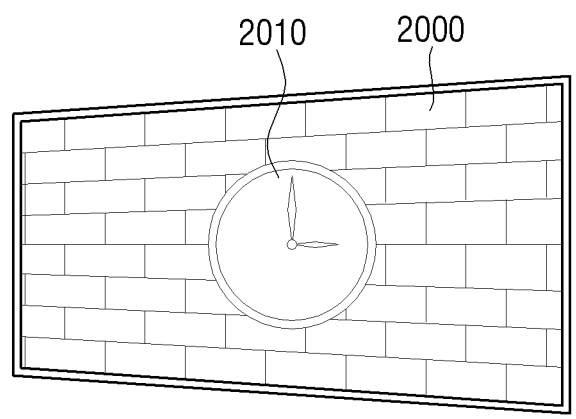
FIG. 20 is a diagram illustrating an example of a screen in which a display is viewed on the display side when view angle improvement processing is not performed, according to an example embodiment.

Accordingly, when the user looks at the display 1730 from the display side, as illustrated in FIG. 20, the background image 2000 and the object 2010 may appear to be blurred due to the color drop phenomenon.

To prevent the color drop phenomenon, a view angle improvement processing may be performed. According to an example embodiment, a view angle improvement processing is performed with respect to only the object image rather than the entire image and thus, a three-dimensional perception with respect to a displayed object is further improved.

Figure 21:
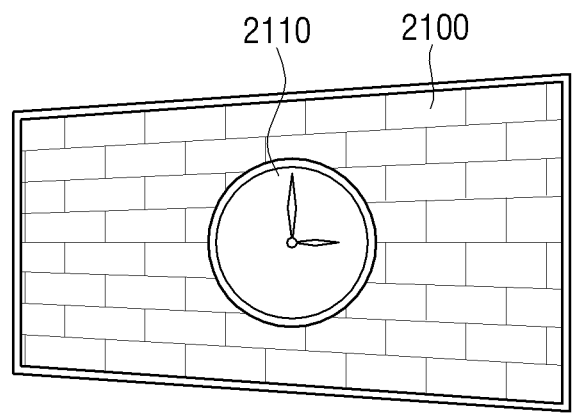
FIG. 21 is a diagram illustrating an example of a screen in which the display is viewed on the display side when view angle improvement processing is performed, according to an example embodiment.

For example, as illustrated in FIG. 21, the background image 2100 appears to be blurred due to the color drop phenomenon in the same manner as illustrated in FIG. 20. However, a view angle improvement processing is performed with respect to the object image and thus, a color drop phenomenon becomes less even from the side view. Accordingly, the user can see the clock clearly and the background image appears blurry, and thus may feel as if he or she were looking at a clock image of which the background image is out-of-focus. That is, a stereoscopic effect in which a clock screen is close and a background image is far away may be felt more significantly.

Figure 22:
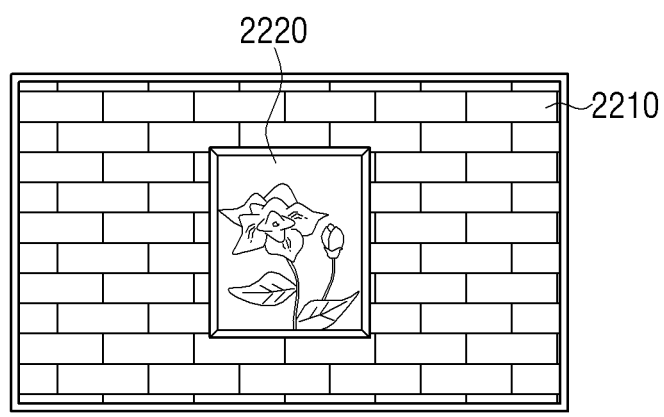
FIG. 22 is a diagram illustrating an example of a display screen that is displayed in the second operation mode, according to an example embodiment.

FIG. 22 is a diagram illustrating an example of a display screen that is displayed in the second operation mode.

Referring to FIG. 22, the display 1730 displays a background image as a main screen 2210, and displays a picture as an object image 2220. In this case, the display apparatus 1730 performs the view angle improvement processing only on the object image 2220 corresponding to the drawing, so that an effect in which the drawing and the background appear spaced apart from each other can be obtained.

In the above example embodiment, the view angle improvement processing is performed on the object image, and that the view angle improvement processing is not performed on the main image. In example embodiments, the reverse may be performed.

For example, in order to give the user the feeling that a window with a remote view is placed in the area where the display apparatus 1700 is located, the display apparatus 1700 may display a window that displays a hill or mountain on the background image. In this regard, the display apparatus 1700 performs the view angle improvement processing on the background image and does not perform the view angle improvement process on the object corresponding to the window in order to provide the stereoscopic effect in which an image such as a mountain or a hill in the window is located farther away than the background image.

Figure 23:
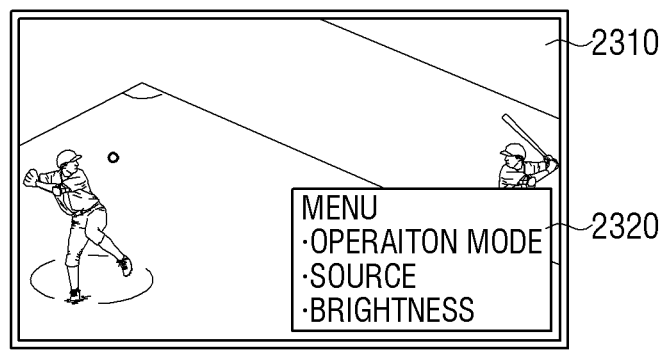
FIG. 23 is a diagram illustrating one example a display screen of a display screen that is displayed in the first operation mode, according to an example embodiment.

FIG. 23 is a diagram illustrating an example of a display screen that is displayed in the first operation mode.

Referring to FIG. 23, the display apparatus 1700 displays a content screen 2310 that is selected by the user in the first operation mode. In this case, the user may select a menu for changing a setting of the display apparatus 1700, and the menu may be an OSD. When a menu is selected, the display apparatus 1700 may display an OSD menu 2320 on the content screen 2310.

In this case, the display apparatus 1700 performs the view angle improvement processing on the display OSD menu 2320 and does not perform the view angle improvement process on the displayed content image 2310 so that the user further concentrates on the OSD menu screen.

Figure 24:
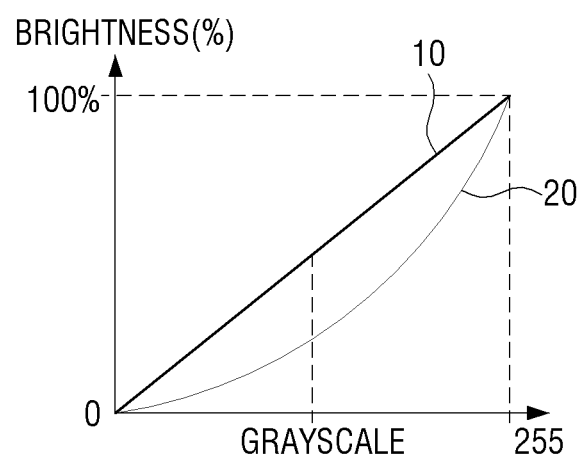
FIG. 24 is a diagram illustrating a view angle processing method, according to an example embodiment.

FIG. 24 is a diagram illustrating a method for processing view angle.

Referring to FIG. 24, a luminance value with respect to an input brightness value is represented according to view position. Specifically, the first line 10 represents a change of a luminance value that is sensed with respect to the input brightness value when the display is viewed from the front side. Referring to the above, it can be understood that from the front side of the display, a luminance value is linearly changed according to a change of luminance value.

The second line 20 is a change of luminance value that is sensed with respect to the input brightness value when the display is viewed from the side view. Referring to the above, on the side of the display, it can be seen that the luminance value is detected lower than the front with respect to the change of the brightness value.

Accordingly, if the change in the luminance value when viewed from the side is the same as that in the first graph 10, the display apparatus 1700 may increase the input brightness value when the view angle is improved.

Such operation may be performed either in hardware or in software.

For example, by arranging the subpixel which operates at the time of low gradation and the subpixel which operates at the time of high gradation with respect to one pixel position, it is possible to improve the view angle by driving different pixels according to the input gradation.

Alternatively, it is possible to improve the view angle in software by using a plurality of lookup tables and using different lookup tables for each gradation section. In this regard, the lookup table may be a first lookup table having a reference gamma value and a second lookup table having a gamma value lower or higher than the reference gamma.

Accordingly, the display apparatus 1700 may calculate the luminance value using the first lookup table for the background image and the second lookup table for the object image. Alternatively, at the time of implementation, the display apparatus 1700 calculates the luminance value based on the second lookup table for the pixels corresponding to the object with respect to the combined image, and calculates the luminance value based on the first lookup table for the remaining area.

One hardware or software method for improving the view angle is described above. If the view angle can be improved, methods other than the above method can be applied.

At the time of implementation, only one of the above-described view angle improving methods may be applied, or the above-described view angle improving methods may be combined and applied. For example, a software view angle improvement method may be applied to the object image, and a hardware view angle improvement method may be applied to the combined image. That is, for an object image, both a software method and a hardware method may be applied, and only a hardware method may be applied to a background image. Alternatively, a hardware method may be applied to the object image, and a software method may be applied to the background image.

Figure 25:
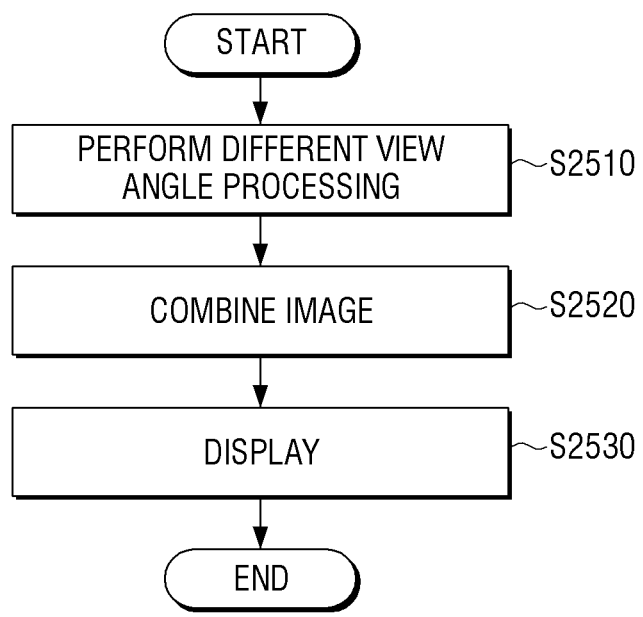
FIGS. 25 and 26 are diagrams illustrating methods for controlling the display apparatus, according to example embodiments.

FIG. 25 is a diagram illustrating a controlling method according to the first example embodiment.

Referring to FIG. 25, the display apparatus 1700 performs different view angle improvement processing with respect to each of the object image and the main image, at operation S2510. Specifically, the display apparatus 1700 may perform view angle improvement processing on the object image, and may not perform view angle improvement processing on the background image. At the time of implementation, if the view angle improvement processing is performed in two image modes, the degree of improvement may be different.

In addition, the display apparatus 1700 combines the object image and the main image to which the view angle improvement processing is performed, at operation S2520. In this regard, the main image may be a normal image or a background image that is displayed in the second operation mode. If the main image is a normal image, the object image may be an image that corresponds to an OSD. In addition, if the main image is a background image, the object image may be a motion graphic, etc., such as an analog clock, digital clock, photo image, picture and fish tank.

Then, the display apparatus 1700 displays the combined image, at operation S2530.

The controlling method according to the present example embodiment as described above performs different view angle improvement processing to each of the main image and the object image and thus, the displayed main image and object image have different stereoscopic effect according to a view angle. The method of controlling a display apparatus of FIG. 25 may be performed, for example, in a display apparatus having the configuration of FIG. 3 or FIG. 17, and may also be performed in a display apparatus having other configurations.

Figure 26:
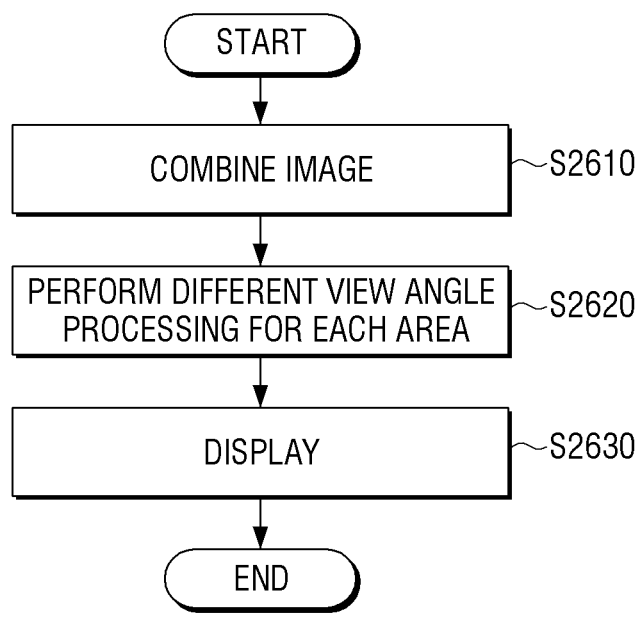

FIG. 26 is a diagram illustrating a method of controlling a display apparatus, according to another example embodiment.

Referring to FIG. 26, the display apparatus 1700 combines a main image and an object image, at operation S2610. In this regard, the main image may be a normal content image or a background image that is displayed in the second operation mode. If the main image is a normal image, when the user inputs an OSD display command, the object image may be an image that corresponds to the OSD, and the normal image and the OSD image may be combined as one. In addition, if the main image is a background image, the object image may be a motion graphic, etc., such as an analog clock, digital clock, photo image, picture and fish tank, and may be combined in the form that the object image is disposed on one side of the background image.

The display apparatus 1700 performs different view angle processing for each area, at operation S2620. Specifically, with respect to the combined image, a view angle improvement processing may be performed on an area where the object image is positioned, and the view angle improvement processing may not be performed on the remaining area. Alternatively, with respect to the combined image, a view angle improvement processing in a first method may be performed on an area where the object image is positioned, and a view angle improvement processing in a second method may be performed on the remaining area.

The display apparatus 1700 displays an image to which a view angle processing is performed, at operation S2630.

The method for controlling a display apparatus according to an example embodiment as described above performs a view angle improvement processing only on an area that corresponds to the object image and thus, the displayed main image and object image have a different variable stereoscopic perception according to a view angle. The method of controlling a display apparatus of FIG. 26 may be performed, for example, in a display apparatus having the configuration of FIG. 2 or FIG. 17, and may also be performed in a display apparatus having other configurations.

The above-described controlling method according to various exemplary embodiments may be implemented in a program and provided to display apparatuses. In particular, the program including a method for controlling a display apparatus according to exemplary embodiments may be stored in a non-transitory computer readable medium and provided therein.

The non-transitory computer readable medium refers to a medium that stores data semi-permanently rather than storing data for a very short time, such as a register, a cache, a memory or etc., and is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus, comprising:
   a display configured to display an image;
   at least one sensor configured to generate sensing data relating to a position of a user with respect to the display apparatus;
   a memory configured to store background image data relating to a background image of a background area behind the display; and
   a processor configured to generate a content screen based on the background image data and the sensing data and control the display to display the generated content screen,
   wherein the content screen includes the background image and at least one graphic object disposed on the background image, and
   wherein at least one from among the background image and the at least one graphic object are changed in response to a change of the sensing data.

2. The apparatus as claimed in claim 1, wherein the processor is further configured to, in response to a user movement determined based on the sensing data, change at least one from among a position, a color, and a size of the at least one graphic object based on the user movement.

3. The apparatus as claimed in claim 1, wherein the processor is further configured to, in response to a user movement determined based on the sensing data, change at least a part of the at least one graphic object based on the user movement.

4. The apparatus as claimed in claim 1, wherein the processor is further configured to, in response to a determination based on the sensing data that the user is positioned within a predetermined distance from the display apparatus control the display to remove at least a part of the at least one graphic object.

5. The apparatus as claimed in claim 1, wherein the processor is further configured to, in response to receiving a user input while the at least one graphic object is displayed, control the display to rotate the at least one graphic object based on the user input.

6. The apparatus as claimed in claim 1, wherein the processor is further configured to control the display to change a brightness of the content screen in response to a user movement determined based on the sensing data.

7. The apparatus as claimed in claim 1, wherein the content screen further includes a shadow of the at least one graphic object, and
   wherein the processor is further configured to control the display to change the shadow in response to a change of the at least one graphic object.

8. The apparatus as claimed in claim 1, further comprising:
   at least one camera configured to acquire an image having an angle of view of 360 degrees with reference to the display apparatus,
   wherein the background image data is acquired by using a camera from among the at least one camera to photograph the background area behind the display apparatus.

9. The apparatus as claimed in claim 1, wherein the at least one sensor is further configured to include at least one camera having an angle of view of at least 180 degrees with reference to the display apparatus, and
   wherein the at least one camera is further configured to acquire the sensing data.

10. The apparatus as claimed in claim 1, wherein the processor is further configured to deactivate the display in response to determining that the user is not present in a peripheral area of the display apparatus based on the sensing data.

11. The display apparatus of claim 1, wherein the content screen comprises an image generated by combining the at least one graphic object with the background image.

12. A method for controlling a display apparatus that includes a display, the method comprising:
    storing background image data relating to a background image of a background area behind the display;
    acquiring, from at least one sensor, sensing data relating to a position of a user with respect to the display apparatus;
    generating a content screen based on the background image data and the sensing data; and
    displaying the generated content screen,
    wherein the content screen includes the background image and at least one graphic object disposed on the background image, and
    wherein at least one from among the background image and the at least one graphic object are changed in response to a change of the sensing data.

* * * * *